US007016334B2

(12) United States Patent
Cohen et al.

(10) Patent No.: US 7,016,334 B2
(45) Date of Patent: Mar. 21, 2006

(54) DEVICE, SYSTEM, METHOD AND COMPUTER READABLE MEDIUM FOR FAST RECOVERY OF IP ADDRESS CHANGE

(75) Inventors: Alon Cohen, Nitzaney-Oz (IL); Amit Haller, Belmont, CA (US); Peter Fornell, Lake Oswego, OR (US); Avraham Itzchak, Ra'anana (IL); Ziv Haparnas, Tel Aviv (IL)

(73) Assignee: IXI Mobile ( Israel) Ltd., Ra'anana (IL)

( * ) Notice: Subject to any disclaimer, the term of this patent is extended or adjusted under 35 U.S.C. 154(b) by 0 days.

(21) Appl. No.: 10/435,098

(22) Filed: May 9, 2003

(65) Prior Publication Data

US 2004/0008653 A1    Jan. 15, 2004

Related U.S. Application Data

(63) Continuation-in-part of application No. 09/932,180, filed on Aug. 17, 2001.

(51) Int. Cl.
  *H04L 12/46* (2006.01)
  *H04L 12/66* (2006.01)
(52) U.S. Cl. .................... 370/338; 370/349; 370/401; 455/432.1; 455/452.1
(58) Field of Classification Search ................ 370/338, 370/395.2; 455/426, 556, 557
  See application file for complete search history.

(56) References Cited

U.S. PATENT DOCUMENTS 5,442,680 A    8/1995  Schellinger et al.

(Continued)

FOREIGN PATENT DOCUMENTS

WO    WO 99/48315    9/1999

(Continued)

OTHER PUBLICATIONS

Yee et al., "Integrating Bluetooth With Wireless And Ricocheting", pp. 1310-1314, 2000 IEEE.

(Continued)

*Primary Examiner*—Alpus H. Hsu
*Assistant Examiner*—Justin M. Philpott
(74) *Attorney, Agent, or Firm*—Vierra Magen Marcus Harmon & DeNiro LLP

(57) ABSTRACT

A device, method, system and computer readable medium allows for a fast recovery of a communication connection in response to a newly assigned Wide Area Network ("WAN") Internet protocol ("IP") source address. In an embodiment of the present invention, a device provides communication between a WAN and a short distance wireless network. The device comprises a memory to store a first and a second WAN address for the device and a router software component. The processor and router software component transfers a first plurality of packets between the device and the wide area network using the first wide area network address. The processor and router software component discontinues the transfer of the first plurality of packets responsive to receiving the second wide area network address and transfers a second plurality of packets between the device and the wide area network using the second wide area network address. The second newly assigned WAN address may have been assigned by the WAN after a disconnection of communication between the device and a server in the WAN. In an embodiment of the present invention, the router software includes a plurality of private IP addresses for respective terminals, in the short distance wireless network, associated with the WAN IP address. In an embodiment of the present invention, a Point-to-Point ("PPP") connection or Transfer Control Protocol ("TCP") connection is discontinued and then initiated in response to a newly assigned WAN IP address in order to quickly recover a communication connection between terminals in the short distance wireless network and the WAN.

33 Claims, 12 Drawing Sheets

U.S. PATENT DOCUMENTS

| | | | |
|---|---|---|---|
| 5,457,737 A | 10/1995 | Wen | |
| 5,572,528 A | 11/1996 | Shuen | |
| 5,742,237 A | 4/1998 | Bledsoe | |
| 5,771,438 A | 6/1998 | Palermo et al. | |
| 5,774,791 A | 6/1998 | Strohallen et al. | |
| 5,793,763 A | 8/1998 | Mayes et al. | |
| 5,805,166 A | 9/1998 | Hall et al. | |
| 5,838,252 A | 11/1998 | Kikinis | |
| 5,896,369 A | 4/1999 | Warsta et al. | |
| 5,929,848 A | 7/1999 | Albukerk et al. | |
| 5,978,386 A | 11/1999 | Hamalainen et al. | |
| 5,987,011 A | 11/1999 | Toh | |
| 5,987,033 A | 11/1999 | Boer et al. | |
| 6,064,734 A | 5/2000 | Hasegawa et al. | |
| 6,067,291 A | 5/2000 | Kamerman et al. | |
| 6,069,896 A | 5/2000 | Borgstahl et al. | |
| 6,078,789 A | 6/2000 | Bodenmann et al. | |
| 6,085,098 A | 7/2000 | Moon et al. | |
| 6,130,602 A | 10/2000 | O'Toole et al. | |
| 6,151,628 A | 11/2000 | Xu et al. | |
| 6,192,257 B1 | 2/2001 | Ray | |
| 6,198,948 B1 | 3/2001 | Sudo et al. | |
| 6,218,958 B1 | 4/2001 | Eichstaedt et al. | |
| 6,223,029 B1 | 4/2001 | Stenman et al. | |
| 6,243,581 B1 * | 6/2001 | Jawanda | 455/432.2 |
| 6,265,788 B1 | 7/2001 | Davidson et al. | |
| 6,282,183 B1 | 8/2001 | Harris et al. | |
| 6,298,443 B1 | 10/2001 | Colligan et al. | |
| 6,326,926 B1 | 12/2001 | Shoobridge | |
| 6,333,973 B1 | 12/2001 | Smith et al. | |
| 6,343,276 B1 | 1/2002 | Barnett | |
| 6,405,027 B1 | 6/2002 | Bell | |
| 6,430,408 B1 | 8/2002 | Dorenbosch | |
| 6,434,537 B1 | 8/2002 | Grimes | |
| 6,446,127 B1 | 9/2002 | Schuster et al. | |
| 6,452,910 B1 | 9/2002 | Vij et al. | |
| 6,459,882 B1 | 10/2002 | Palermo et al. | |
| 6,463,078 B1 * | 10/2002 | Engstrom et al. | 370/466 |
| 6,487,180 B1 | 11/2002 | Borgstahl et al. | |
| 6,519,460 B1 | 2/2003 | Haartsen | |
| 6,532,366 B1 | 3/2003 | Chung et al. | |
| 6,600,428 B1 | 7/2003 | O'Toole et al. | |
| 6,600,734 B1 | 7/2003 | Gernert | |
| 6,630,925 B1 | 10/2003 | Osterg.ang.rd et al. | |
| 6,633,759 B1 | 10/2003 | Kobayashi | |
| 6,636,489 B1 | 10/2003 | Fingerhut | |
| 6,654,616 B1 | 11/2003 | Pope et al. | |
| 6,665,549 B1 | 12/2003 | Reed | |
| 6,690,929 B1 | 2/2004 | Yeh | |
| 6,763,012 B1 | 7/2004 | Lord et al. | |
| 6,763,247 B1 | 7/2004 | Hollstrom et al. | |
| 6,871,063 B1 | 3/2005 | Schiffer | |
| 2001/0047424 A1 | 11/2001 | Alastalo et al. | |
| 2002/0010008 A1 | 1/2002 | Bork et al. | |
| 2002/0010683 A1 | 1/2002 | Aune | |
| 2002/0037700 A1 | 3/2002 | Dooley et al. | |
| 2002/0055333 A1 | 5/2002 | Davies et al. | |
| 2002/0058502 A1 | 5/2002 | Stanforth | |
| 2002/0063472 A1 | 5/2002 | Irvin | |
| 2002/0065099 A1 | 5/2002 | Bjorndahl | |
| 2002/0065817 A1 | 5/2002 | Ito et al. | |
| 2002/0068559 A1 * | 6/2002 | Sharma et al. | 455/423 |
| 2002/0068600 A1 | 6/2002 | Chihara et al. | |
| 2002/0069037 A1 | 6/2002 | Hendrickson et al. | |
| 2002/0082054 A1 | 6/2002 | Keinonen et al. | |
| 2002/0086718 A1 | 7/2002 | Bigwood et al. | |
| 2002/0091633 A1 | 7/2002 | Proctor | |
| 2002/0102974 A1 | 8/2002 | Raith | |
| 2002/0118663 A1 * | 8/2002 | Dorenbosch et al. | 370/338 |
| 2002/0128051 A1 | 9/2002 | Liebenow | |
| 2002/0132610 A1 | 9/2002 | Chaplin et al. | |
| 2002/0142762 A1 | 10/2002 | Chmaytelli et al. | |
| 2002/0143952 A1 | 10/2002 | Sugiarto et al. | |
| 2002/0155830 A1 | 10/2002 | Iyer | |
| 2002/0160764 A1 | 10/2002 | Gorsuch | |
| 2003/0013438 A1 | 1/2003 | Darby | |
| 2003/0017810 A1 | 1/2003 | Janninck et al. | |
| 2003/0022699 A1 | 1/2003 | Lin | |
| 2003/0027563 A1 | 2/2003 | Herle et al. | |
| 2003/0032417 A1 | 2/2003 | Minear et al. | |
| 2003/0050058 A1 | 3/2003 | Walsh et al. | |
| 2003/0054765 A1 | 3/2003 | Botteck | |
| 2003/0060188 A1 | 3/2003 | Gidron | |
| 2003/0060189 A1 | 3/2003 | Minear et al. | |
| 2003/0078036 A1 | 4/2003 | Chang et al. | |
| 2003/0091917 A1 | 5/2003 | Jensen et al. | |
| 2003/0114105 A1 | 6/2003 | Haller et al. | |
| 2003/0115351 A1 | 6/2003 | Giobbi | |
| 2003/0122856 A1 | 7/2003 | Hubbard | |
| 2003/0143992 A1 | 7/2003 | Humphrey et al. | |
| 2003/0153280 A1 | 8/2003 | Kopp et al. | |
| 2003/0187807 A1 | 10/2003 | Matsubara et al. | |
| 2003/0214940 A1 | 11/2003 | Takken | |
| 2003/0224773 A1 | 12/2003 | Deeds | |
| 2003/0232616 A1 | 12/2003 | Gidron et al. | |
| 2004/0001467 A1 * | 1/2004 | Cromer et al. | 370/338 |
| 2004/0048671 A1 | 3/2004 | Rowe | |
| 2004/0066769 A1 | 4/2004 | Ahmavaara et al. | |
| 2004/0192384 A1 | 9/2004 | Anastasakos et al. | |
| 2004/0196812 A1 | 10/2004 | Barber | |

FOREIGN PATENT DOCUMENTS

| | | |
|---|---|---|
| WO | WO 00/39967 | 7/2000 |
| WO | WO 01/048977 | 7/2001 |

OTHER PUBLICATIONS

Haartsen, "BLUETOOTH—The universal radio interface for ad hoc wireless connectivity", pp. 110-117, Ericsson Review No. 3, 1998.

Guthery et al., "The WebSIM—Clever Smartcards Listen to Port 80", version 15.12.99.

Project P946-GI, Smart Devices "When Things Start to Think", Jan. 2000, 2000 EURESCOM Participants in Project P946-GI.

White Paper, Handheld Devices: Comparing the Major Platforms, www.dell.com/r&d, Dec. 2000.

Miyatsu, Bluetooth Design Background and Its Technological Features, IEICE Trans, Fundamentals, vol. E83-A, No. 11, Nov. 2000.

Parekh, Operating Systems on Wireless Handheld Devices, A Strategic Market Analysis, Massachusettes Institute of Technology, Sep. 28, 2000.

Johansson, et al., Short Range Radio Based Ad-hoc Netowrking: Performance and Properties, IEEE, 1999.

Karagiannis, "Mobility support for ubiquitous Internet access", Ericsson Open report, pp. 1-70, Dec. 21, 2000.

Frodigh et al., "Wireless ad hoc networking—The art of networking without a network", Ericsson Review No. 4, 2000, pp. 248-263.

Faruque et al, "Design and Analysis of Ad Hoc Wireless Networks for Battlefield Applications", Part of the SPIE Conference on Digitization of the Battlespace IV, Orlando, Flordia,. Apr., 1999, pp. 118-122.

Garcia-Luna-Aceves et al., "Wireless Internet Gateways (Wings)", 1997 IEEE, pp. 1271-1276.

* cited by examiner

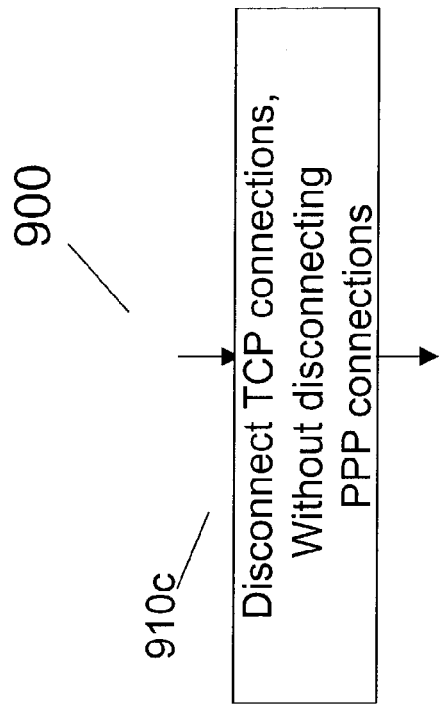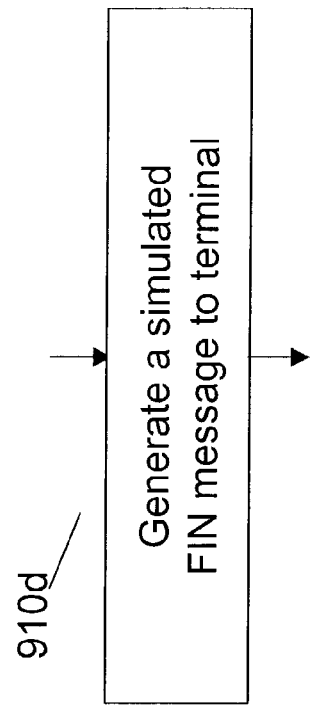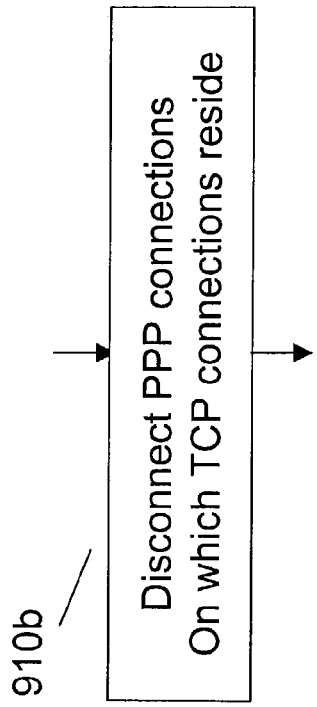

DEVICE, SYSTEM, METHOD AND COMPUTER READABLE MEDIUM FOR FAST RECOVERY OF IP ADDRESS CHANGE

RELATED APPLICATION

This application is a continuation-in-part of U.S. patent application Ser. No. 09/932,180, entitled "A System, Device and Computer Readable Medium for Providing Network Services on a Mobile Device," filed on Aug. 17, 2001, which is incorporated herein by reference.

FIELD OF THE INVENTION

This invention relates generally to networks.

BACKGROUND OF THE INVENTION

Communicating between networks, and in particular between a wide area network ("WAN") and a short distance wireless network, is important.

An operator of a WAN adjusts network configuration and operation in order to maximize usage and accessibility of WAN network services. Likewise, an operator of a short distance wireless network, which is coupled to a WAN, desires to maximize the availability of WAN network services to the short distance wireless network operator, and in particular to short distance wireless network applications.

Similarly, a WAN may be interested in information and/or services provided by a short distance wireless network. Thus, it is desirable to enhance the communication between a WAN and a short distance wireless network in order to maximize the availability and usage of each network's services.

However, a short distance wireless network that communicates with a WAN is dynamically assigned an address by the WAN. Typically, whenever a wireless communication link is established between a WAN and a short distance wireless network, the WAN assigns a source address for the short distance wireless network to use when generating messages to the WAN. For example, a terminal in a short distance wireless network may be interested in accessing a web site on a server in the WAN. Typically, the terminal will use the recently assigned source address to create a session for generating messages between the server and the terminal. After initiating a session, the server will maintain the session by recognizing and responding the messages having the assigned source address.

Yet, whenever the wireless communication link between a WAN and short distance wireless network is temporarily disconnected, another source address, which is likely different than the previous source address, is assigned to the short distance wireless network. When devices and/or terminals in the short distance wireless network attempt to continue communicating with the WAN, they will use the newly assigned source address in generating messages to components of the WAN, such as a WAN server. Messages that a terminal will transmit towards a WAN server will now be seen by the WAN server as having a new source address and port number, and therefore will be discarded silently by the server without a user knowing of the failing communication. The terminal will retransmit until the terminal exhausts retry attempts. This failing communication may take over 20 minutes from the first sent attempt to an abort, and possibly much longer.

Therefore, it is desirable to provide a device, system, method and computer readable medium that enhances communication between a WAN and a short distance wireless network. It is further desirable to provide a device, system, method and computer readable medium that allows for fast recovery of a temporary disconnection of communication between a device in a short distance wireless network and a WAN.

SUMMARY OF THE INVENTION

A device, method, system and computer readable medium allows for a fast recovery of a communication connection in response to a newly assigned Wide Area Network ("WAN") Internet protocol ("IP") source address. In an embodiment of the present invention, a device provides communication between a WAN and a short distance wireless network. The device comprises a memory to store a first and a second WAN address for the device and a router software component. The processor and router software component transfers a first plurality of packets between the device and the wide area network using the first WAN address. The processor and router software component discontinues the transfer of the first plurality of packets responsive to receiving the second WAN address and transfers a second plurality of packets between the device and the wide area network using the second wide area network address.

According to an embodiment of the present invention, a second WAN address is assigned by the WAN after a disconnection of communication between the device and the WAN.

According to another embodiment of the present invention, the router software includes a plurality of private IP addresses for respective terminals, in the short distance wireless network, associated with a WAN IP source address.

According to an embodiment of the present invention, a Point-to-Point ("PPP") connection or Transfer Control Protocol ("TCP") connection is discontinued and then initiated in response to a newly assigned WAN IP source address in order to quickly recover a communication connection between one or more terminals in the short distance wireless network and the WAN.

According to yet another embodiment of the present invention, the wide area network includes a cellular network.

According to an embodiment of the present invention, the router software component includes a network address translator ("NAT") component to translate between the first WAN address and a first short distance wireless network address.

According to an embodiment of the present invention, the router software component includes a network address port translation ("NAPT") component to translate between the first WAN address and a first short distance wireless network address.

According to another embodiment of the present invention, the device further includes a Bluetooth™ processor and a 2.4 GHZ transceiver.

According to an embodiment of the present invention, the short distance wireless network is a Bluetooth™ wireless local area network or an 802.11 wireless local area network.

A method for transferring information between a wide area network and a short distance wireless network is provided in an embodiment of the present invention. A first wide area network address is obtained from the wide area network for a first device in the short distance wireless network. The first wide area network address is stored in the first device. A first plurality of packets are transferred, using the first wide area network address, between the first device and the wide area network. A second wide area network address is received from the wide area network for the first device. The second wide area network address is stored in the first device. The transferring of the first plurality of packets is discontinued. A second plurality of packets is transferred, using the second wide area network address, between the first device and the wide area network.

According to an embodiment of the present invention, the wide area network includes a cellular network providing dynamic wide area network IP source addresses.

A system for providing communication between a wide area network and a short distance wireless network is provided in an embodiment of the present invention. A hand-held wireless device includes a cellular transceiver to communicate with the wide area network and receive a first and a second IP address for the hand-held wireless device. A hand-held memory is coupled to the transceiver and stores the first and second IP addresses. A routing software component, stored in the memory, transfers a first plurality of packets, using the first IP address, between the wide area network and the short distance wireless network. The routing software component discontinues the transfer of the first plurality of packets and transfers a second plurality of packets using the second IP address. A first wireless device transfers the first and second plurality of packets to the hand-held wireless device, wherein the first wireless device has a first private network address.

According to an embodiment of the present invention, the first wireless device is selected from a group consisting of a desktop computer, a laptop computer, a personal digital assistant, a headset, a pager, a pen, a printer, a watch, a digital camera and an equivalent.

According to an embodiment of the present invention, the hand-held wireless device uses a protocol selected from a group consisting of Global System for Mobile communications ("GSM"), Code Division Multiple Access ("CDMA"), CDMA2000, Universal Mobile Telecommunications System ("UMTS"), Time Division Multiple Access ("TDMA") and an equivalent to communicate with the wide area network.

According to an embodiment of the present invention, a second wireless device transfers a third plurality of packets to the hand-held wireless device, wherein the second wireless device has a second private network address.

An article of manufacture, including a computer readable medium, is provided in another embodiment of the present invention. A short-range radio software component provides a short-range radio signal in a short distance wireless network. A cellular software component provides a communication signal in a wide area network. A routing software component transfers a first plurality of packets, using a first wide area network address, between the wide area network and the short distance wireless network. The routing software component discontinues the transfer of the first plurality of packets and transfers a second plurality of packets using a second wide area network address.

Other aspects and advantages of the present invention can be seen upon review of the figures, the detailed description, and the claims that follow.

BRIEF DESCRIPTION OF THE FIGURES

FIGS. 9–11a–d are flowcharts of a method according to embodiments of the present invention.

DETAILED DESCRIPTION

I. System Overview

Figure 1:
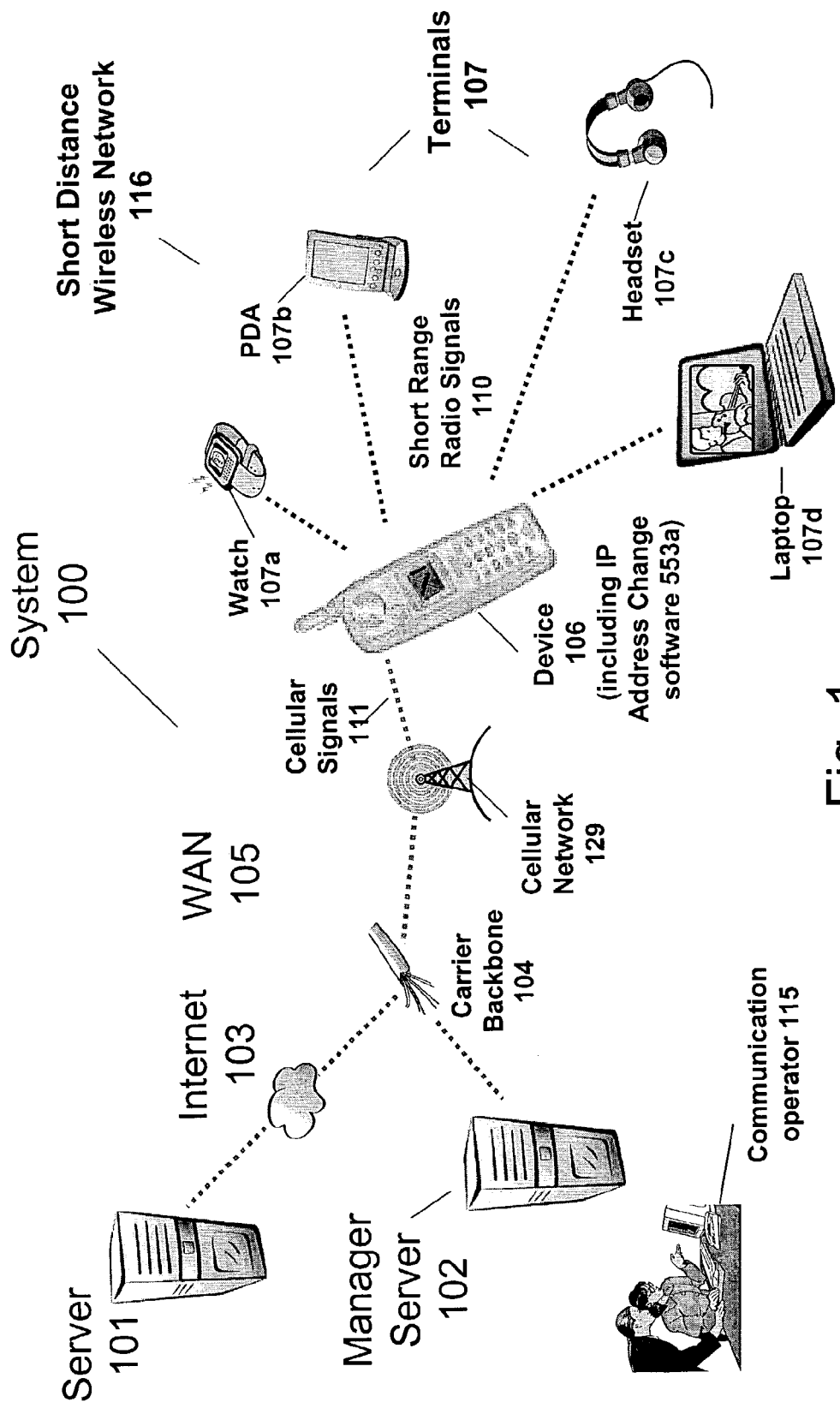
FIG. 1 illustrates a system according to an embodiment of the present invention.

The following description and claims relate to a device, method, system, and computer readable medium for enhancing communication between a WAN and a short distance wireless network. In an embodiment of the present invention, a device 106 including IP address change software 553a enhances communication between terminals 107 in short distance wireless network 116 and WAN 105 shown in FIG. 1. In particular, IP address change software 553a disconnects communication connections between a selected terminal in short distance wireless network 116 and a component in WAN 105, such as server 101, in response to a public WAN IP source address newly assigned to device 106. A new communication connection using the newly assigned public WAN IP source address is established between the selected terminal and server 101 immediately after the temporary disconnection in an embodiment of the present invention. Thus, multiple communication retries by the selected terminal to server 101 using the previously assigned public WAN IP source address is avoided.

In an embodiment of the present invention, a short distance wireless network is a network of processing devices, such as a personal computer or headset, that span a relatively small physical area, wherein at least one device generates and receives a short-range radio signal for communicating with another device in the network. In an embodiment of the present invention, a short-range radio signal can travel between approximately 0 and approximately 1000 feet. An example of a short distance wireless network includes a network of devices formed by Bluetooth™, HomeRF, 802.11 technologies, or an equivalent, singly or in combination. In an embodiment of the present invention, each processing device in a short distance wireless network has its own processing unit that executes a software component stored on the processing device memory, but also may access data and devices on the short distance wireless network. In an embodiment of the present invention, a wire, and in particular an Ethernet, provides communication between two or more processing devices in a short distance wireless network. In an alternate embodiment, electromagnetic signals provide wireless communication between one or more processing devices in a short distance wireless network. In still another embodiment, both wires and electromagnetic signals provide communication between processing devices in a short distance wireless network.

In an embodiment of the present invention, a WAN includes multiple local area networks ("LANs") and/or short distance wireless networks connected over a relatively large distance. Telephone lines and electromagnetic signals, singly or in combination, couple the LANs and/or short distance wireless networks in a WAN. In an embodiment of the present invention, WAN 105 includes a cellular network 129 generating and receiving cellular signals 111. In an embodiment of the present invention, a cellular network is defined as a communication system dividing a geographic region into sections, called cells. In an analog embodiment of the present invention, the purpose of this division is to make the most use out of a limited number of transmission frequencies. In an analog embodiment of the present invention, each connection, or for example conversation, requires its own dedicated frequency, and the total number of available frequencies is about 1,000. To support more than 1,000 simultaneous conversations, cellular systems allocate a set number of frequencies for each cell. Two cells can use the same frequency for different conversations so long as the cells are not adjacent to each other.

Figure 3A:
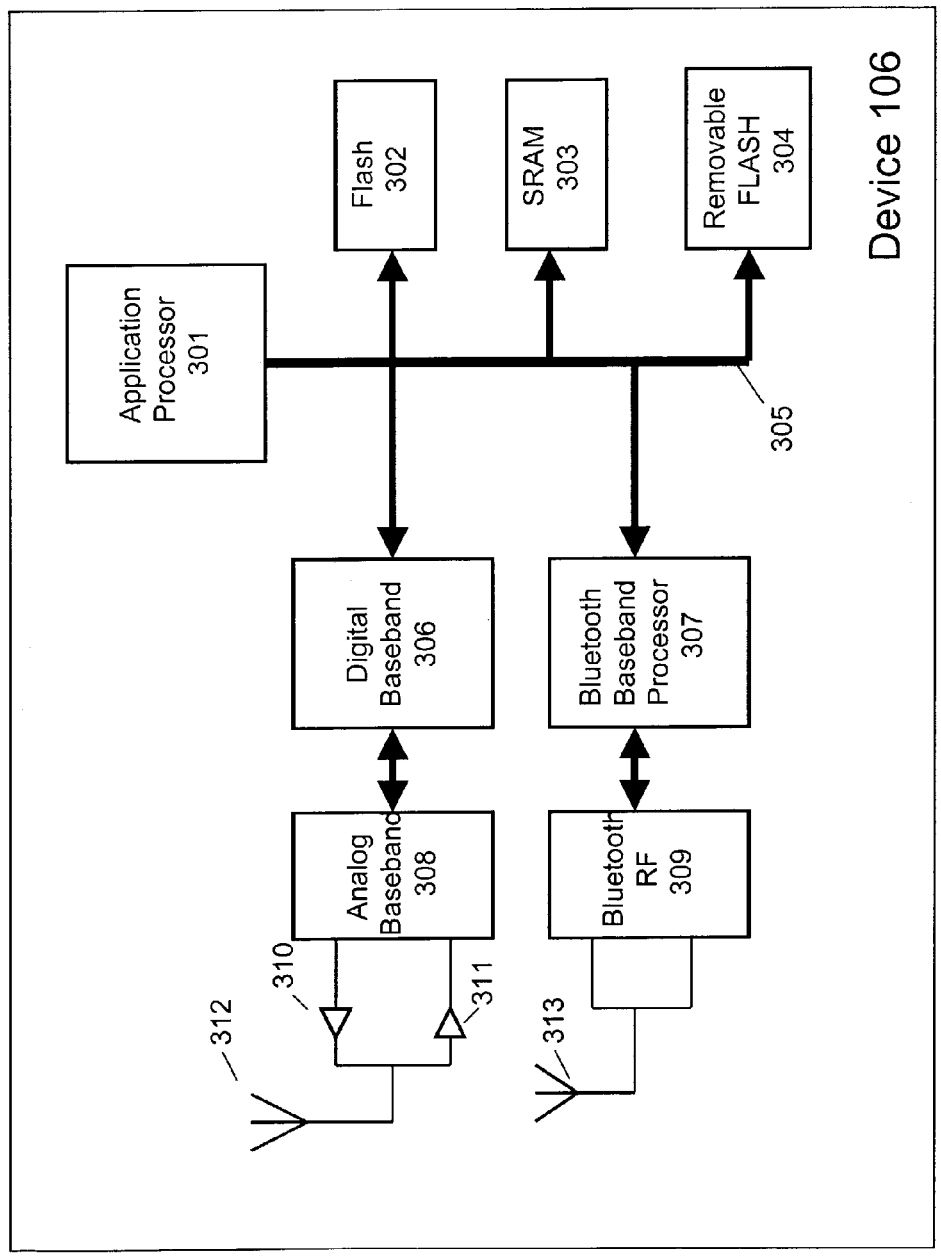
FIGS. 3a–b are hardware block diagrams of a wireless device and a wireless hand-held device according to an embodiment of the present invention.
Figure 3B:
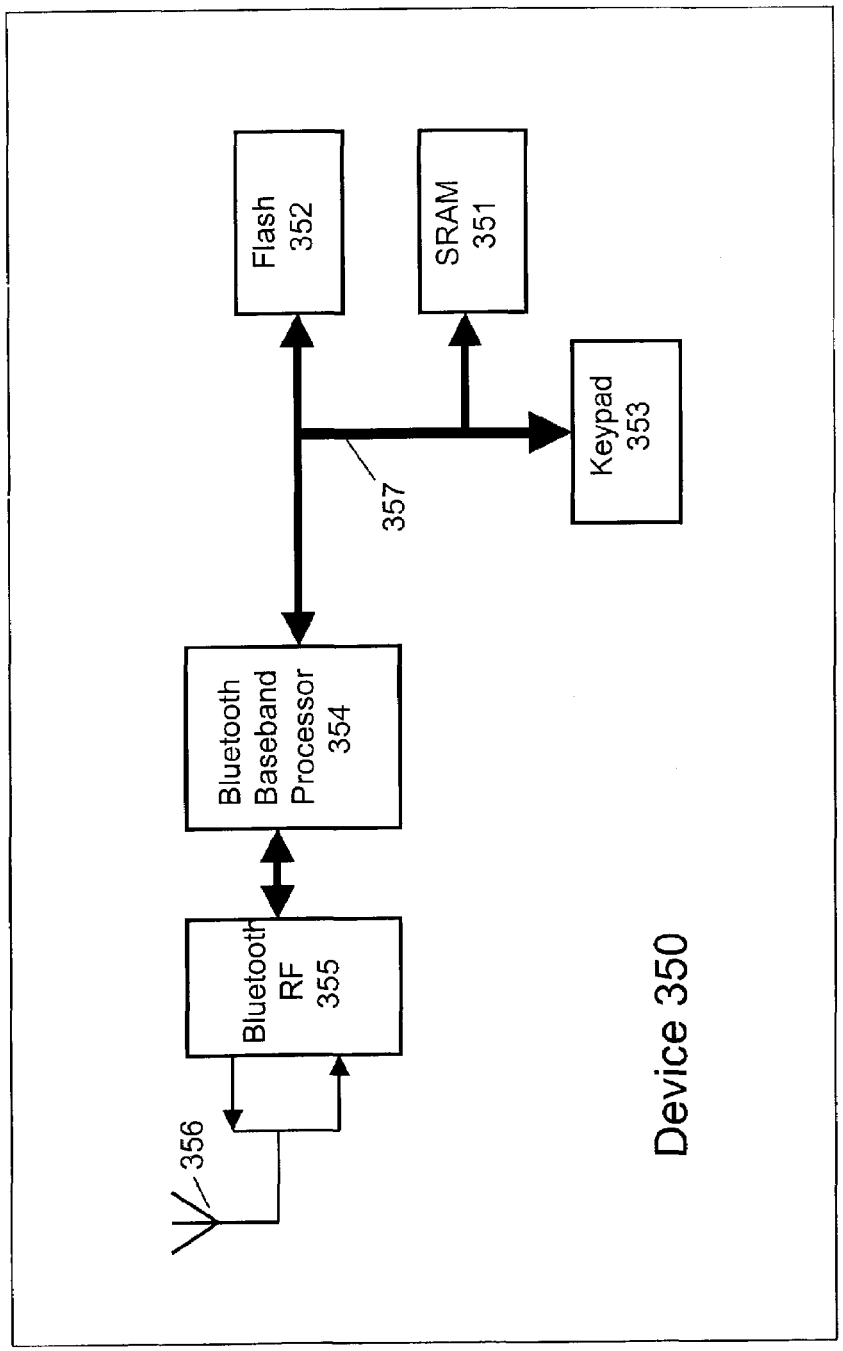

FIG. 1 illustrates system 100 according to an embodiment of the present invention. System 100 includes other devices or terminals 107 coupled to wireless device 106. In an embodiment of the present invention, device 106 and one or more terminals 107 communicate to form a short distance wireless network 116. In an embodiment of the present invention, terminals 107 are coupled to device 106 by short-range radio signals 110 to form short distance wireless network 116. In an embodiment of the present invention, some or all of terminals 107 may have wired connections. In an embodiment of the present invention, terminals 107 include a watch 107a, PDA 107b, headset 107c and laptop computer 107d that generate respective output signals. In an alternate embodiment, fewer or more terminals are used in short distance wireless network 116. In an alternate embodiment, terminals 107 include a desktop computer, a pager, a pen, a printer, a watch, a thin terminal, a messaging terminal, a digital camera or an equivalent. In an embodiment of the present invention, terminals 107 include a Bluetooth™ 2.4 GHz transceiver. Likewise, device 106 includes a Bluetooth™ 2.4 GHZ transceiver. In an alternate embodiment of the present invention, a Bluetooth™ 5.7 GHZ transceiver is used. Hardware for device 106 and terminals 107 are illustrated in FIGS. 3a–b in an embodiment of the present invention.

In alternate embodiments of the present invention, other local wireless technologies, such as 802.11 or HomeRF signals, are used to communicate between device 106 and terminals 107.

In an embodiment of the present invention, WAN 105 is coupled to device 106. In an embodiment of the present invention, WAN 105 includes a cellular network 129 transmitting and receiving cellular signals 111. In an embodiment of the present invention, cellular signals 111 are transmitted using a protocol, such as a Global System for Mobile communications ("GSM") protocol. In alternate embodiments, a Code Division Multiple Access ("CDMA"), CDMA 2000, Universal Mobile Telecommunications System ("UMTS"), Time Division Multiple Access ("TDMA"), General Packet Radio Service ("GPRS") protocol or an equivalent is used.

In an embodiment of the present invention, WAN 105 includes carrier backbone 104, servers 101–102 and Internet 103. In an embodiment of the present invention, IP packets are transferred between the components illustrated in FIG. 1. In alternate embodiments of the present invention, other packet types are transferred between the components illustrated in FIG. 1. In an embodiment of the present invention, a packet includes predetermined fields of information, such as header field and data field. A header field may include information necessary in transferring the packet, such as a source IP address.

In an embodiment of the present invention, WAN 105 includes an IP public or private network, such as a corporate secured network using a Virtual Private Network ("VPN").

In an alternate embodiment of the present invention, device 106 is coupled to WAN 105 by an Ethernet, Digital Subscriber Line ("DSL"), or cable modem connection, singly or in combination.

In an embodiment of the present invention, device 106 is a cellular handset or telephone. In an alternate embodiment of the present invention, device 106 is a cellular enabled PDA, wireless modem and/or wireless laptop computer.

In an embodiment of the present invention, WAN 105 is coupled to a wireless carrier internal network or carrier backbone 104. In an embodiment of the present invention, server 102 is coupled to carrier backbone 104. In an alternate embodiment of the present invention, carrier backbone 104 is coupled to Internet 103. Server 101 is coupled to Internet 103. In an embodiment of the present invention, servers 101 and 102 provide information, such as web pages or application software components, to terminals 107 by way of device 106. In an embodiment of the present invention, manager server 102 provides a microrouter 404 and/or network service plug-ins 406a–k to device 106, as described below. Further, manager server 102, monitors applications and terminals in a short distance wireless network 116. In an embodiment of the present invention, terminals 107 share services and communicate by way of device 106.

In an embodiment of the present invention, one or more terminals in short distance wireless network 116 accesses information and/or services from server 101. In an embodiment of the present invention, server 101 provides device 106 with a public WAN IP source address to allow for devices in short distance wireless network 116 to communicate, by way of a TCP/IP protocol connection, with server 101. In an alternate embodiment, server 101 is a termination point for a session initiated by device 106 (or terminals 107) and an alternate address server provides public WAN IP source addresses to device 106.

II. Hand-Held Device/Terminal Hardware

Figure 2:
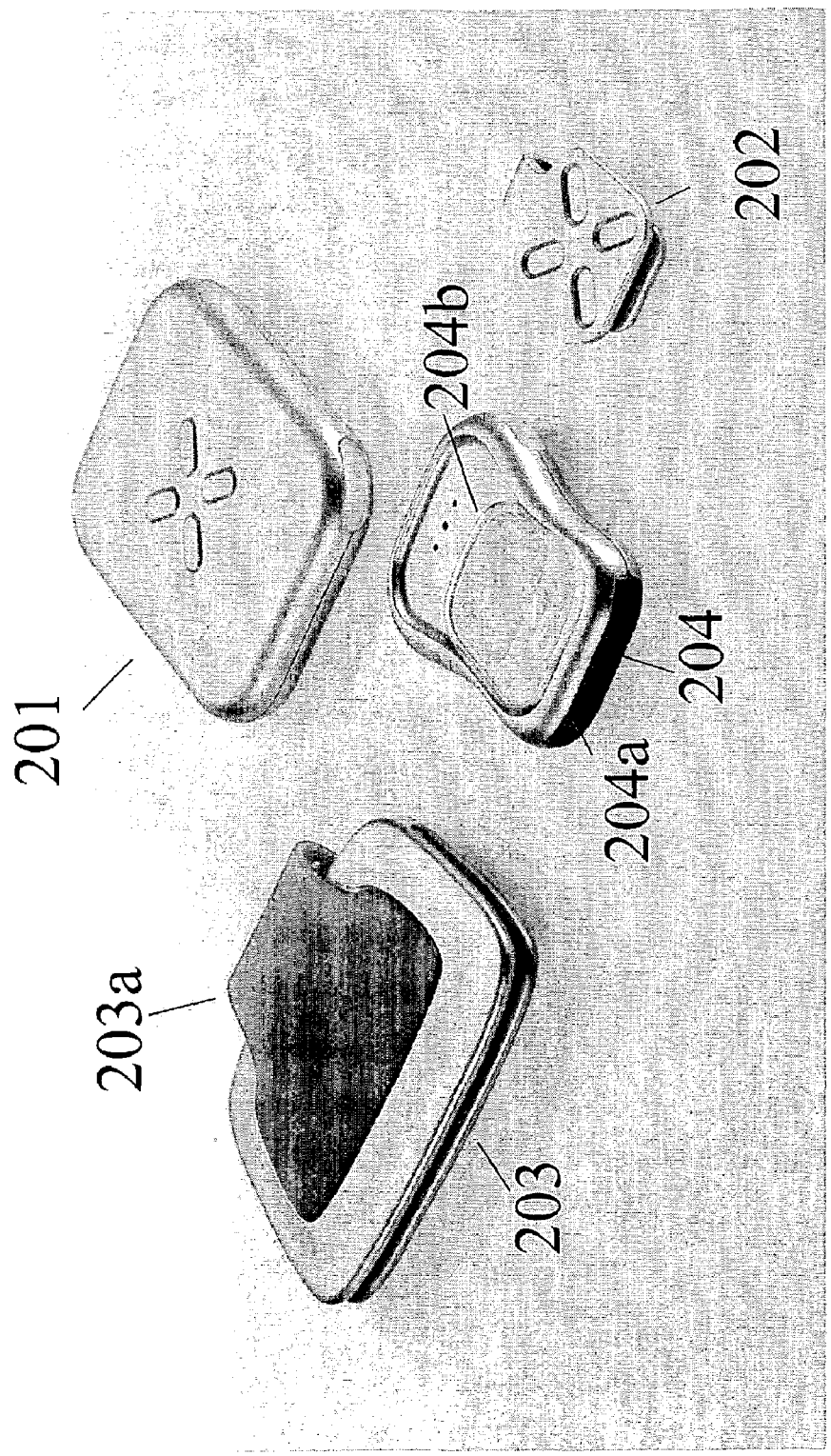
FIG. 2 illustrates thin terminals and a wireless device according to an embodiment of the present invention.

FIG. 2 illustrates embodiments of terminals 107 and device 106. In an embodiment of the present invention, there are two types of terminals: 1) smart terminals and 2) thin terminals. In an alternate embodiment of the present invention, smart terminals execute user logic and applications. Smart terminals have a relatively powerful processing unit, operating system and applications. Their main needs from a short distance wireless network 116 are access to a WAN 105 through TCP/IP and other network services such as storage and execution. For example, a laptop computer 107d and PDA 107b are smart terminals. Thin terminals have a relatively low power processing unit and operating system. They are mainly used as peripherals to an application server in a short distance wireless network 116 and their main task is user interaction, rendering output for a user and providing an application server with a user's input. For example, a watch 107a or messaging terminals can be thin terminals.

FIG. 2 illustrates thin terminals. Voice terminal 204 includes a display 204b and a retractable keypad 204a. Messaging Terminal 203 is illustrated in a closed position with a hinge 203a used to open and close terminal 203. Terminal 203 also includes a miniature QWERTY keyboard and display when opened.

In an embodiment of the present invention, device 201 is a cellular modem and includes a clip 202 for a belt.

FIG. 3a illustrates a hardware block diagram of device 106 in an embodiment of the present invention. Device 106 includes both internal and removable memory. In particular, device 106 includes internal FLASH (or Electrically Erasable Programmable Read-Only Memory ("EEPROM") and Static Random Access Memory ("SRAM") 302 and 303, respectively. Removable FLASH memory 304 is also used in an embodiment of the present invention. Memories 302, 303, and 304 are coupled to bus 305. In an embodiment of the present invention, bus 305 is an address and data bus. Application processor 301 is likewise coupled to bus 305. In an embodiment of the present invention, processor 301 is a 32-bit processor.

Bluetooth™ processor 307 is also coupled to bus 305. Bluetooth™ RF circuit 309 is coupled to Bluetooth™ processor 307 and antenna 313. Processor 307, RF circuit 309 and antenna 313 transceive and receive short-range radio signals to and from terminals 107, illustrated in FIG. 1, or device 350, illustrated in FIG. 3b.

Cellular, such as GSM, signals are transmitted and received using digital circuit 306, analog circuit 308, transmitter 310, receiver 311 and antenna 312. Digital circuit 306 is coupled to bus 305. In alternate embodiments, device 106 includes a display, a speaker, a microphone, a keypad and a touchscreen, singly or in combination.

FIG. 3b illustrates device 350 that is a hand-held device in an embodiment of the present invention. Device 350, in an embodiment of the present invention, is one of the terminals 107 illustrated in FIG. 1. Similar to device 106, device 350 includes SRAM and FLASH memory 351 and 352, respectively. Memories 351 and 352 are coupled to bus 357. In an embodiment of the present invention, bus 357 is an address and data bus. Keypad 353 is also coupled to bus 357. Short-range radio signals are transmitted and received using Bluetooth™ processor 354 and Bluetooth™ RF circuit 355. Antenna 356 is coupled to Bluetooth™ RF circuit 355. In an embodiment of the present invention, antenna 356 transmits and receives short-range radio signals. In alternate embodiments, device 350 includes a display, a speaker, a microphone, a keypad and a touchscreen, singly or in combination. As one of ordinary skill in the art would appreciate, other hardware components would be provided for device 350 in alternate embodiments of the present invention. For example in an embodiment in which device 350 is a laptop computer 107d, a disk drive and other input/output components are present.

III. Software

Figure 4:
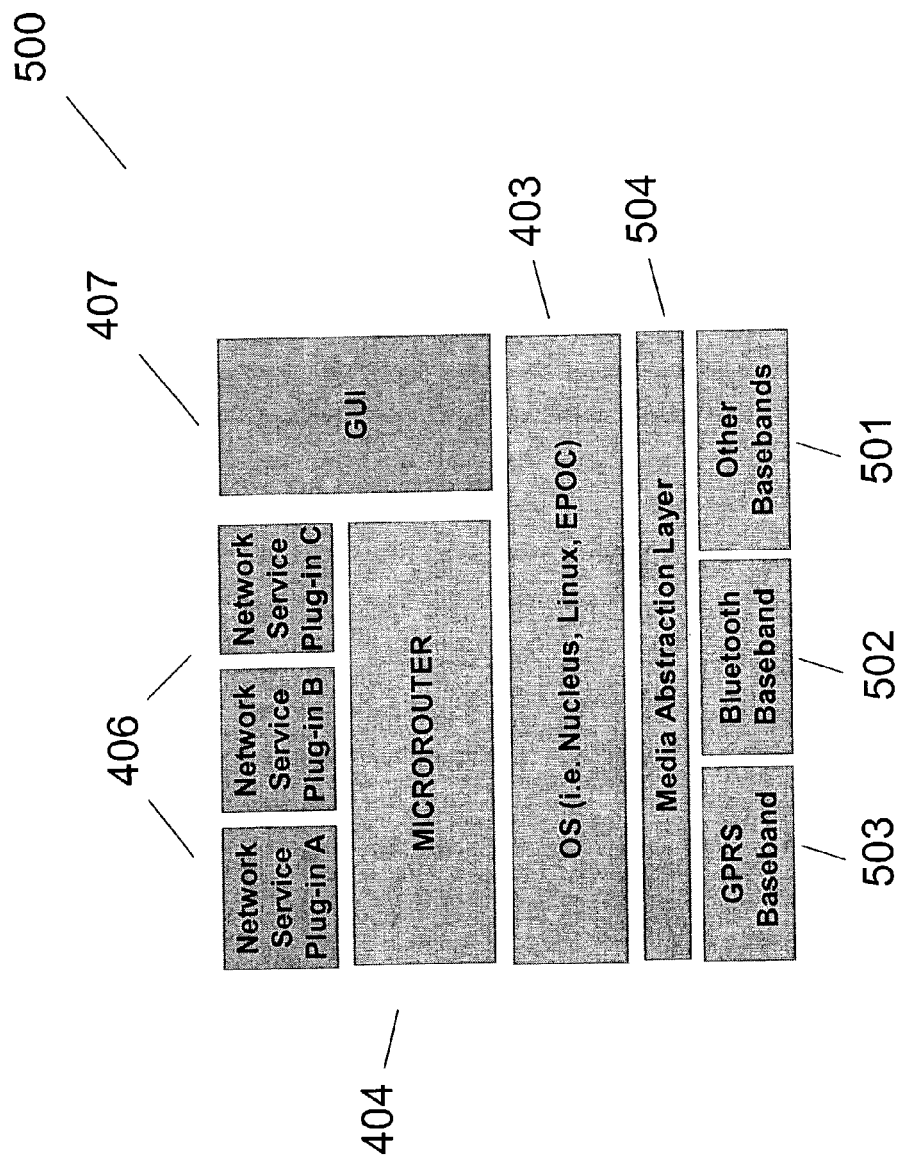
FIGS. 4–7 are software block diagrams for a wireless device according to an embodiment of the present invention.

FIG. 4 illustrates a software architecture 500 for device 106 illustrated in FIG. 3a according to an embodiment of the present invention. In an embodiment of the present invention, software 500 is stored in FLASH memory 302. In an embodiment of the present invention, software components referenced in FIGS. 4–14 8 represent a software program, a software object, a software function, a software subroutine, a software method, a software instance, and a code fragment, singly or in combination. In an alternate embodiment, functions performed by software components illustrated in FIGS. 4–14 8 are carried out completely or partially by hardware.

In an embodiment of the present invention, software 500, or components of software 500, is stored in an article of manufacture, such as a computer readable medium. For example, software 500 is stored in a magnetic hard disk, an optical disk, a floppy disk, CD-ROM (Compact Disk Read-Only Memory), RAM (Random Access Memory), ROM (Read-Only Memory), or other readable or writeable data storage technologies, singly or in combination. In yet another embodiment, software 500, or components thereof, is downloaded from manager server 102 illustrated in FIG. 1.

Software 500 includes telecommunication software or physical layer protocol stacks, in particular cellular communication software 503 and short-range radio communication software 502. In an embodiment, communication software 503 is a GPRS baseband software component used with processor 306 to transmit and receive cellular signals. In an embodiment, communication software 502 is a Bluetooth™ baseband software component used with processor 307 to transmit and receive short-range radio signals. Other telecommunication software may be used as illustrated by other basebands 501.

In an embodiment of the present invention, operating system ("OS") 403 is used to communicate with telecommunication software 502 and 503. In an embodiment of the present invention, operating system 403 is a Linux operating system, EPOC operating system available from Symbian software of London, United Kingdom or a PocketPC or a Stinger operating system available from Microsoft® Corporation of Redmond, Wash. or Nucleus operating system, available from Accelerated Technology, Inc. of Mobile, Ala. Operating system 403 manages hardware and enables execution space for device software components.

Media abstraction layer 504 allows operating system 403 to communicate with basebands 503, 502 and 501, respectively. Media abstraction layer 504 and other abstraction layers, described herein, translate a particular communication protocol, such as GPRS, into a standard command set used by a device and/or terminal. The purpose of an abstraction layer is to isolate the physical stacks from the rest of the device software components. This enables future usage of different physical stacks without changing any of the upper layer software and allows the device software to work with any communication protocol.

Furthermore, Graphics User Interface ("GUI") 407 is provided to allow a user-friendly interface.

Microrouter 404 and network service plug-in 406 enables an IP based network or enhanced IP based network, respectfully.

A. Microrouter

Microrouter 404 enables an IP based network between device 106 and terminals 107. In an embodiment of the present invention, each terminal can leverage the existing IP protocol, exchange information with other terminals and gain access to a WAN through microrouter 404. Extended network services, such as network service plug-ins 406, may be added to microrouter 404. In an embodiment, manager server 102, installs microrouter 404 and network service plug-ins 406 on device 106.

Figure 5:
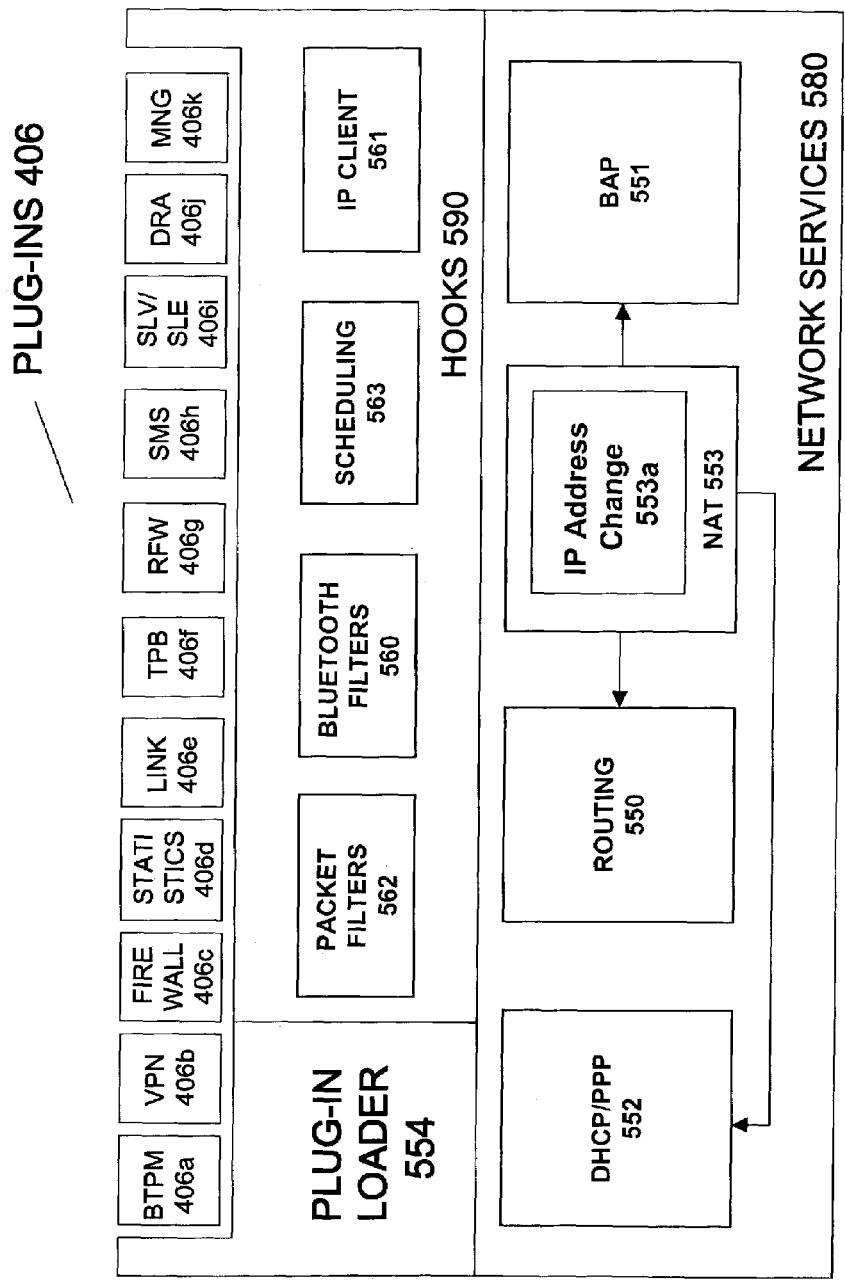

FIG. 5 illustrates software components of microrouter 404. In an embodiment of the present invention, routing component 550, Bluetooth™ LAN Access Profile component 551, Point-to-Point Protocol ("PPP") component 552 and Network Address Translator ("NAT") component 553 are included in microrouter 404. In an alternate embodiment, other components, such as packet filters 562, Bluetooth™ filters 560, scheduling 563 and IP client 561 are included in microrouter 404. In still another embodiment, microrouter 404 includes hooks 590 for adding network services plug-ins 406.

1. Microrouter Services

In an embodiment, microrouter 404 services include software components for a short distance wireless network that has access to a WAN. In an embodiment, the software components included in a microrouter 404 are described below.

a. Bluetooth™ Access Profile ("BAP")

BAP software component 551 enables Bluetooth™ terminals to gain access to short distance wireless network 116 and a WAN by using an IP protocol.

In an embodiment of the present invention, BAP 551 includes implementation of two Bluetooth™ usage profiles such as: 1) Bluetooth™ LAN Access Profile software and 2) Bluetooth™ Dial-Up Profile software.

Bluetooth™ LAN Access Profile software component allows a LAN Access client in a terminal to obtain an IP address and use the IP address in order to gain connectivity to other short distance wireless network terminals or to a WAN, behaving as if they were on a short distance wireless network.

Bluetooth™ Dial-Up Profile software component enables a terminal to dial-up to any termination number and get IP services from that termination. In addition, a Bluetooth™ Dial-Up Profile ("DUP") software component emulates termination in device 106. In an embodiment, microrouter 404 has either a Bluetooth™ LAN Access Profile software component or a Bluetooth™ Dial-Up Profile software component. In an alternate embodiment, microrouter 404 includes both Profile software components. In a Bluetooth™ Dial-Up Profile software component mode, a terminal dials a predefined number, for example 999, for which microrouter 404 will not actually dial the number over a cellular network, but emulates as if the number was dialed and a modem answered the call. Microrouter 404 will provide the terminal with an IP address and access to WAN 105. From the terminal's point of view it is as if the terminal dialed a number 999 to a modem and received an IP service from that modem, but in reality the terminal used DUP to obtain packet switching access to WAN 105 and the call was actually terminated at microrouter 404.

b. Routing

Routing software component 550 is responsible for transferring IP packets either in a short distance wireless network or toward a WAN. In a short distance wireless network 116, Routing software component 550 handles broadcasting IP packets and transferring IP packets between terminals. Routing 550 is also responsible for LAN IP Broadcast emulation.

Routing software component 550 is responsible for IP packet queuing/dropping. An IP packet dropping software component is used for reducing congestion caused by having more than one terminal connected simultaneously. In an embodiment of the present invention, Routing software component 550 includes a queuing software component, Quality of Service software component or equivalent for queuing IP packets. Likewise, Routing software component 550 includes a dropping software component that is configured by manager server 102, a user or any other remote entity. In an embodiment of the present invention, manager server 102 defines and loads an IP packet queuing/dropping software component. An operator 115 will be able to define a particular queuing/dropping software component that is suitable for a particular short distance wireless network 116 or user. A user will have a better short distance wireless network 116, and thus a better user experience, without having to configure or monitor a short distance wireless network 116.

In an alternate embodiment of the present invention, Routing software component 550 is a bridge software component for transferring an IP address.

c. PPP

In an embodiment of the present invention, microrouter 404 includes a PPP software component 552, such as a PPP server that is the termination for a short distance wireless network access profile software component. A PPP server provides IP network information, such as an IP address, DNS address or the like, to a terminal.

d. NAT

NAT software component 553 is used 1) because only one public IP address or WAN IP source address is typically made available to a cellular telephone and 2) in order to conserve public IP addresses provided by an operator. In an embodiment of the present invention, WAN 105, and in particular, a cellular packet switching network 129, provides device 106 with one public WAN IP address. A short distance wireless network 116 however includes more than one participating terminal. In order to provide IP addresses to all terminals 107, private short distance wireless network IP addresses will be used for short distance wireless network terminals while NAT 553 is responsible for translations between private short distance wireless network IP addresses and public WAN IP addresses, and vice versa.

i. IP Address Change

Figure 7:
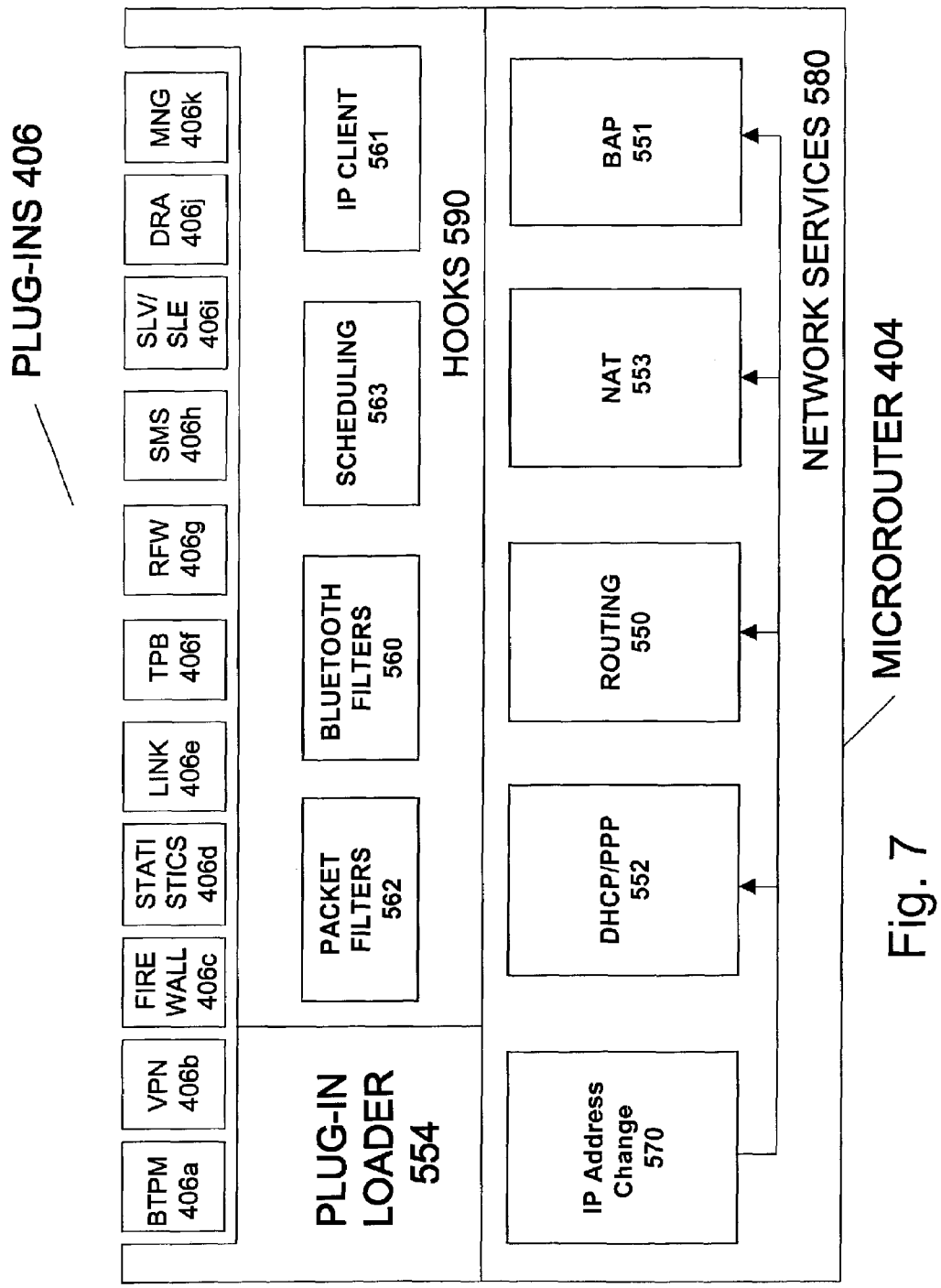

In an embodiment of the present invention, IP Address Change software component 553a is included in NAT software component 553 as illustrated in FIG. 5. In an alternate embodiment of the present invention, an IP Address Change software component 570 is a separate component and not included in NAT software component 553 as illustrated in FIG. 7. As one of ordinary skill in the art would appreciate, the functions of IP Address Change software component 553a or 570 may be included in other software components of microrouter 404 and/or software architecture 500.

IP Address Change software component 553a is responsible for disconnecting communication between one or more terminals in short distance wireless network 116 and components in WAN 105, such as server 101. IP Address Change software component 553a terminates a communication connection in response to a newly assigned public WAN IP source address to device 106. In an embodiment of the present invention, server 101 assigns the new public WAN IP address after a temporary disconnection with device 106. For example, device 106, which may be a cellular telephone, may temporarily lose cellular signals from cellular network 129 due to loss of coverage. In an alternate embodiment of the present invention, a dedicated server responsible for assigning new public WAN IP addresses is used. A new communication connection between one or more terminals and server 101 using the newly assigned public WAN IP source address is then initiated and thus avoids futile retries by one or more terminals using the previously assigned public WAN IP source address.

Figure 6:
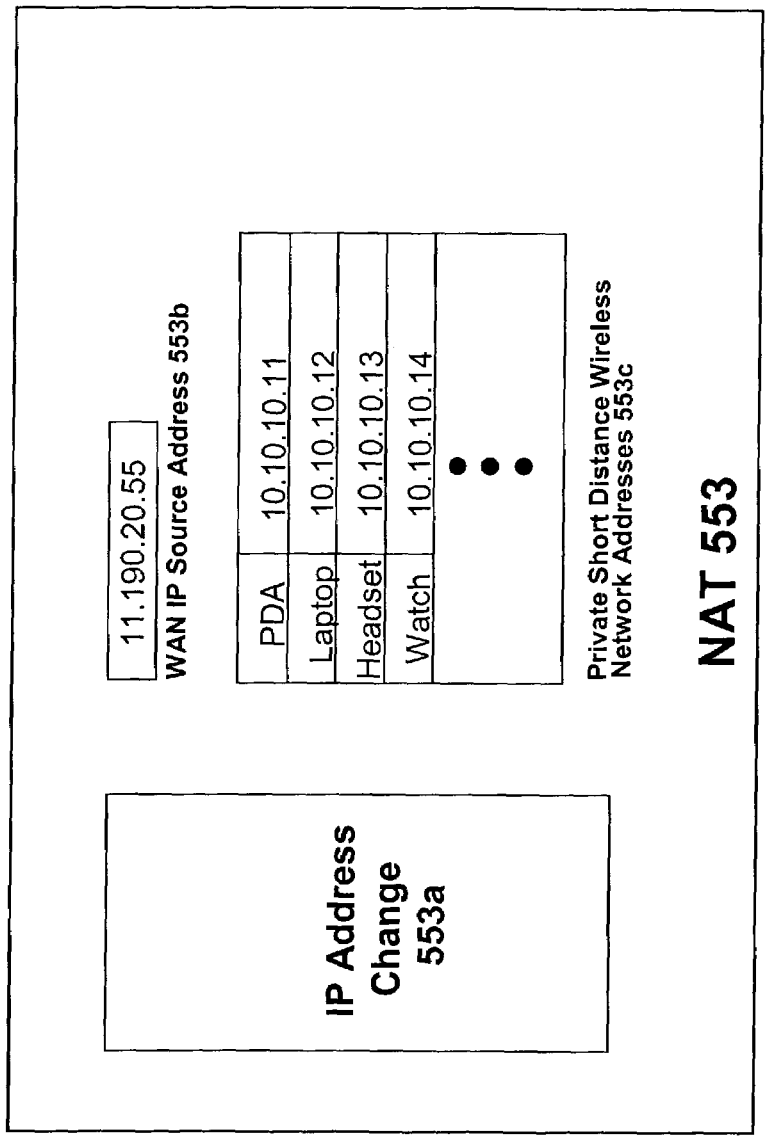

IP change software component 553a is responsible for determining whether a new public WAN IP source address has been assigned to device 106 in an embodiment of the present invention. For example, IP Address Change software component 553a compares the contents of a memory location storing the public WAN IP source address 553b, as shown in FIG. 6, with the previous contents to determine if the address has changed. If the contents of the memory location or WAN IP source address 553b has changed, IP Address Change software component 553a generates an abort or termination message to either DHCP/PPP software component 552, Routing software component 550 or BAP software component 551.

Once a new WAN IP source address 553b is stored in memory, source address 553b is associated with private short distance wireless network addresses 553c. For example, FIG. 6 illustrates private short distance wireless network addresses for respective terminals shown in FIG. 1: PDA 107b, laptop 107d, headset 107c and watch 107a. As one of ordinary skill in the art would appreciate, the public WAN IP source address 553b and private short distance wireless network addresses 553c may be associated by single or multiple translation tables.

In the embodiment illustrated by FIG. 7, a new public WAN IP source address is provided to NAT software component 553; while, a termination signal is provided to either DHCP/PPP software component 552, Routing software component 550 or BAP software component 551.

After termination of a communication connection between one or more terminals in short distance wireless network 116, a second communication connection is initiated with the one or more terminals and server 101 using the newly assigned public WAN IP source address. In an embodiment of the present invention, a terminal initiates a new session by generating a message to server 101 using the newly assigned WAN IP source address after determining that the previous session has terminated.

FIGS. 9, 10 and 11a–d illustrate a method 900 for enhancing communication between WAN 105 and short distance wireless network 116 according to an embodiment of the present invention. In an embodiment, a method is performed, in part or completely, by software components illustrated in FIGS. 5–14 7. In an embodiment of the present invention, a logic box or step illustrated in FIGS. 9, 10 and 11a–d may represent an execution of a software component, such as a software program, a software object, a software function, a software subroutine, a software method, a software instance, a code fragment, singly or in combination. In an alternate embodiment of the present invention, a logic box or step represents execution of a software component, hardware operation or user operation, singly or in combination. In an alternate embodiment of the present invention, fewer or more logic boxes or steps are carried out in the method illustrated in FIGS. 9, 10 and 11a–d.

Figure 9:
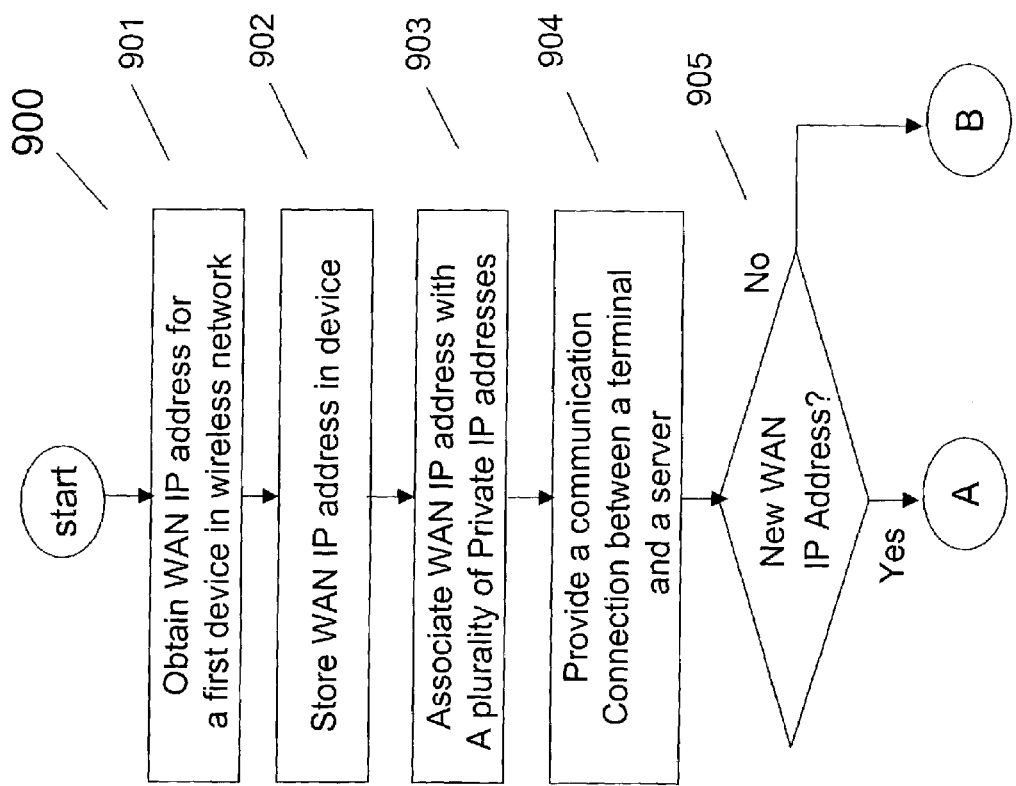

FIG. 9 illustrates a method 900 according to an embodiment of the present invention. Method 900 begins by obtaining a public WAN IP source address as illustrated by logic block 901. In an embodiment of the present invention, device 106 includes IP Address Change software component 553a and obtains a public WAN IP source address from WAN 105, and in particular from an address server. In an embodiment of the present invention, device 106 accesses the address server using cellular network 129.

An obtained public WAN IP source address for device 106 is then stored in device 106 as illustrated by logic block 902. In an embodiment of the present invention, a public WAN IP address, such as WAN IP address 553b, is stored in device 106 memory, and in particular stored in memory 302 by IP Address Change software component 553a as shown in FIG. 6.

Logic block 903 then illustrates associating the stored public WAN IP source address with one or more private wireless network addresses representing terminals in terminals 107, such as private short distance wireless network addresses 553c shown in FIG. 6.

A communication connection is then established between one or more terminals 107 in a short distance wireless network and a server 101 as illustrated by logic block 904. In an embodiment of the present invention, a terminal in short distance wireless network 116 establishes a TCP/IP connection to server 101 by way of device 106. A TCP/IP connection is established by using the stored public WAN IP source address provided by server 101. Thus, a plurality of IP packets are transferred between server 101 and a terminal in terminals 107. In alternate embodiments, other communication connections are established between terminals 107 and components in WAN 105.

Figure 10:
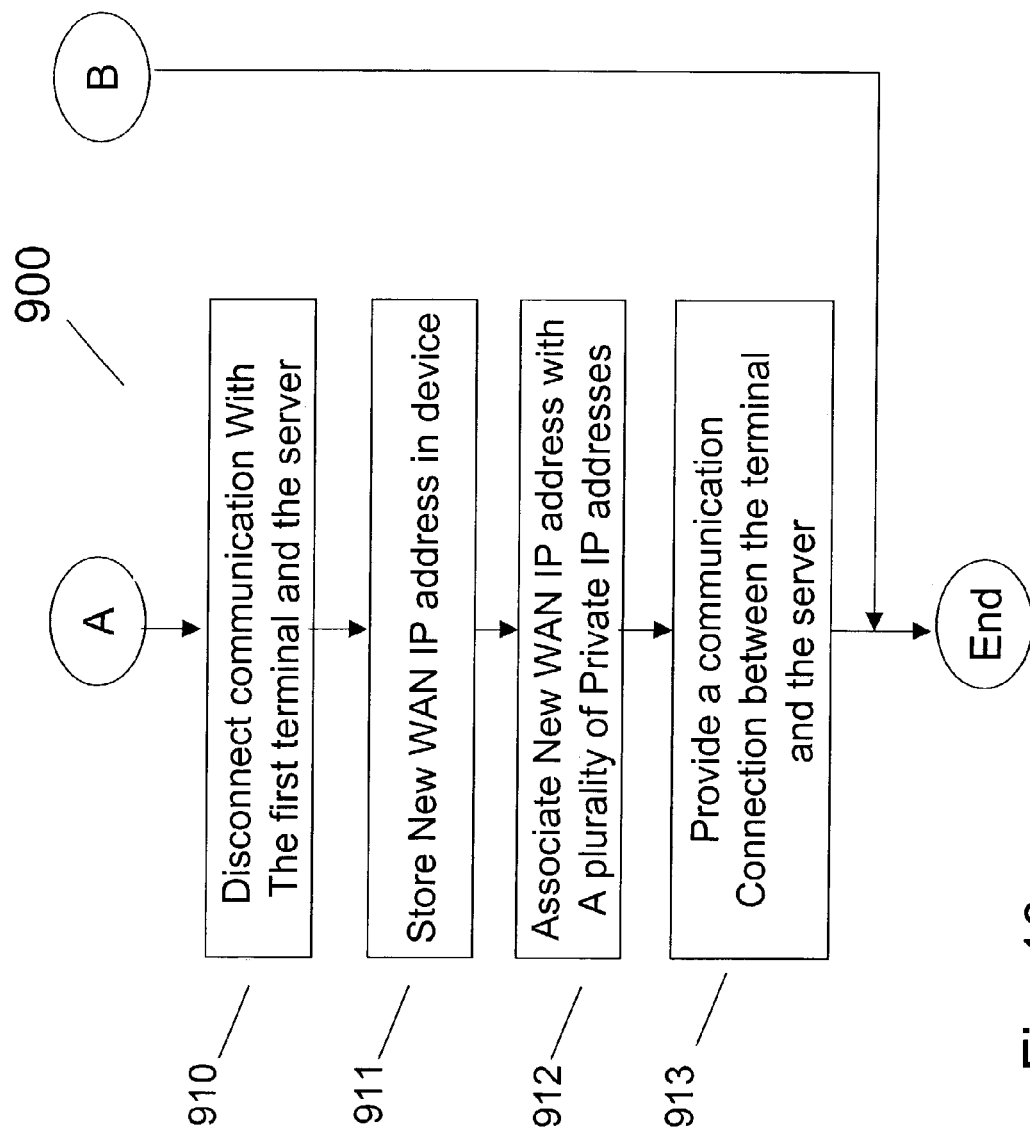

A determination is made whether a new public WAN IP address is provided as illustrated in logic block 905. If a new public WAN IP address is not provided, method 900 ends as illustrated in FIGS. 9 and 10. In an embodiment of the present invention, a new public WAN IP address is provided to device 106, and in particular to IP Address Change software component 553a. In an embodiment of the present invention, an address server provides a new public WAN IP address after device 106 loses a cellular connection with cellular network 129. For example, a user having device 106 is driving in an automobile that enters a tunnel or dead zone where cellular signals 111 cannot be received.

When a determination is made that a new public WAN IP address is obtained, communication with terminals in short distance wireless network 116 that access WAN 105 is terminated as illustrated in logic block 910 shown in FIG. 10. This termination is necessary in order to establish a new connection using the new public WAN IP source address and eliminate unsuccessful retry messages using the previous public WAN IP source address.

There are numerous embodiments in which a communication is terminated as shown in FIGS. 11a–d. In an embodiment of the present invention, FIGS. 11a–d, and in particular, logic blocks 910a–d, illustrate embodiments of performing logic block 910 shown in FIG. 9. In an embodiment of the present invention, IP Address Change software component 553a generates a termination message to DHCP/PPP software component 552 in order to terminate all PPP connections used by one or more terminals in short distance wireless network 116 accessing server 101 in WAN 105.

In still a further embodiment of the present invention, an IP Address Change software component 553a terminates only PPP connections that have residing TCP connections using the previous WAN IP address as illustrated by logic block 910b in FIG. 11b.

In a preferred embodiment of the present invention, an IP Address Change software component 553a terminates TCP connections, which use the previous WAN IP address as illustrated by logic block 910c in FIG. 11c. Thus, by only terminating TCP connections, other communication connections are unaffected and information is allowed to transfer on these connections without interruption.

Yet in another embodiment of the present invention, an IP Address Change software component 553a generates a terminate or simulated FIN (Finish) message to routing software component 550 as illustrated in FIG. 11d. Routing software component 505 then generates an IP packet FIN message to a targeted terminal or the terminal presently attempting to communicate with server 101 as if server 101 generated the FIN message. Upon receiving the FIN message, the targeted terminal believes server 101 has finished the session and thus communication is halted.

In an embodiment of the present invention, a user is queried, by way of providing a pop-up window on a display of PDA 107b, as to whether a connection is to be terminated. A user then may select terminating the connection. In an alternate embodiment, a user is notified that the connection was terminated and queried as to whether the user wishes to reinitiate a connection.

A new public WAN IP source address is then stored in device 106, as described above and as illustrated by logic block 911.

A new public WAN IP source address is then associated with one or more private short distance wireless network addresses representing terminals in short distance wireless network 116 as illustrated by logic block 912.

A communication connection using a new public WAN IP source address is then established between one or more terminals in short distance wireless network 116 and server 101. In an embodiment of the present invention, a TCP/IP connection is established.

In an embodiment of the present invention, a terminal in terminals 107 initiates the communication by way of a retry message using the newly assigned WAN IP address. In alternate embodiments of the present invention, DHCP/PPP software component 552, Routing software component 550 or BAP software component 551 initiate communication, or initiate transferring packets, between one or more terminals in terminals 107 and server 101 in WAN 105, using the newly assigned WAN IP address.

2. Hooks to Extended Network Service Plug-Ins

In an embodiment of the present invention, microrouter 404 includes hooks 590 allowing for the extension of microrouter 404 networking services, such as plug-ins 406. In an embodiment of the present invention, hooks 590 are application program interfaces ("API") for plug-ins 406.

In an embodiment of the present invention, microrouter 404 is programmed to have only basic network abilities and a very low footprint, or in other words require very little memory, for example 100K bytes, in order to be stored in a device 106, such as a cellular telephone. However, in some instances more network services will be needed. Further, operators may want the ability to add and sell network services after the device 106 is sold and in operation without user intervention. A user may be less likely to purchase a network service if the user has to return device 106 to the manufacturer or an inconvenient site.

For these and other reasons, the microrouter 404 includes hooks 590 that enable plug-ins 406 to be implemented in an embodiment of the present invention. This plug-in capability does not define a full execution environment but defines a small framework for implementing code, which can plug-in and extend microrouter 404 network services. In an embodiment of the present invention, hooks 590 are not a user application framework, plug-in code abilities are limited and serve only as an extension to network services.

Plug-ins 406 are fully activated by microrouter 404, which has full control over them in an embodiment of the present invention. In some sense, plug-ins are like a Dynamic Link Library ("DLL") that have a predetermined set of functions that a microrouter can call in order for them to realize the needed functionality.

Below describes software components included in hooks 590 for implementing plug-ins 406 according to an embodiment of the present invention. In an alternate embodiment, other software components are included or replace illustrated software components in hooks 590. For example, software components implementing functionality used by all plug-ins 406, such as hooks for centralized configuration and backend connectivity, are included in hooks 590 in an embodiment of the present invention. These included software components in hooks 590 will save resources and allow for efficient operation.

a. Packet Filters

Packet filters software component 562 allows plug-ins 406 to process IP packets going either internally in a short distance wireless network 116 or externally to and from a WAN. By enabling plug-ins 406 to process IP packets, change any part of a packet, drop a packet or generate more packets, microrouter 404 is able to include multiple other added extended network services. For example, microrouter 404 is able to include a VPN, a firewall, tag packets, monitor packets and other extended network services described below. In an embodiment of the present invention, packet filters 562 is a data path for transferring IP packets that are accessible by plug-ins 406.

b. Bluetooth™ Filters

Bluetooth™ filters software component 560 enables plug-ins 406 to process Bluetooth™ information. In an embodiment, Bluetooth™ filters 560 processes a pairing request event and provides a PIN number. In an embodiment of the present invention, Bluetooth™ filters 560 enables added network services such as PIN management, denying access to a short distance wireless network 116 from a terminal, authenticating a terminal, pairing through an interactive voice response ("IVR") system or the Internet. In an embodiment of the present invention, a Bluetooth™ filters 560 is a data path for transferring Bluetooth™ information that is accessible by plug-ins 406.

c. Scheduling

In order for plug-ins 406 to be able to generate events, traffic or do periodic tasks, a scheduling software component 563 enables a plug-in to receive a callback periodically or when required by the plug-in. For example, Scheduling software component 563 enables a statistics plug-in to send statistic information on terminal and application usage every X hours or calculate average traffic at a selected terminal.

d. IP Client

In an embodiment of the present invention, IP Client software component 561 makes available IP services to plug-ins 406 so a plug-in can obtain an IP address, send IP packets and/or receive IP packets. Thus, IP Client software component 561 enables a plug-in to obtain a private IP address from microrouter 404 and connect to a backend server, such as manager server 102. An IP client 561 can implement a TCP/IP stack or User Datagram Protocol ("UDP"). In an embodiment of the present invention, IP Client plug-in 561 uses all necessary microrouter 404 network services, such as packet filters 562 or NAT 553. From a microrouter 404 perspective, an IP Client 561 is treated like any other terminal on a short distance wireless network 116.

3. Plug-In Loader

A plug-in can be attached to a microrouter 404 during or after manufacturing. In an embodiment of the present invention, a plug-in is stored or programmed in device 106 before shipping from a manufacturer. Alternately, a plug-in is downloaded from manager server 102 at run-time over WAN 105.

A Plug-In Loader software component 554, as illustrated in FIG. 5, is responsible for loading plug-ins 406, programming of plug-ins 406 and notification of newly available plug-ins 406 to microrouter 404 in an embodiment of the present invention.

In an embodiment of the present invention, Plug-In Loader 554 will use operating system 403 capabilities for programming a file system and access of plug-ins 406. In an alternate embodiment of the present invention, Plug-In Loader 554 uses a plug-in directory in a dedicated memory space of device 106.

4. Microrouter Extended Service Plug-Ins

Below describes microrouter 404 extended service plug-ins 406 in an embodiment of the present invention. In various embodiments of the present invention, one or more of plug-ins 406 are attached to microrouter 404. In alternate embodiments, other plug-ins are attached to microrouter 404. In an embodiment of the present invention, a device manufacturer, terminal manufacturer, an operator 115 and/or other third party provides a plug-in.

a. Bluetooth™ Terminal Pairing Management ("BTPM")

BTPM software component plug-in 406a is responsible for PIN management and authenticating terminals for participating in a short distance wireless network 116. BTPM 406*a* allows an operator 115 to control which terminal can connect to a short distance wireless network 116. For example, an operator 115 can deny a terminal from pairing to a short distance wireless network 116, or can approve a terminal for pairing. In an embodiment of the present invention, pairing is done over an IVR, the Internet and/or by a user.

b. VPN

VPN software component plug-in 406*b* enables a secure link to a network, such as a private corporate network. VPN enables terminals to connect to a corporate file server, exchange server or an equivalent. VPN 406*b* uses packet filters 562 in order to identify packets that are routed to a corporate LAN IP subnet. In an embodiment of the present invention, VPN 406*b* then encrypts and tunnels the identified IP packets.

c. Firewall

Firewall software component plug-in 406*c* protects a short distance wireless network 116 from intruders and hackers. In an embodiment of the present invention, Firewall 406*c* uses packet filters 562 for identifying IP packets from non-authorized sources and IP packets that are sent to non-authorized servers. In an embodiment of the present invention, firewall 406*c* enables Uniform Resource Locator ("URL") filtering.

d. Statistics

In an embodiment of the present invention, Statistics software component plug-in 406*d* collects usage profiles and statistics on 1) which terminal in a short distance wireless network 116 is used, 2) how much traffic is generated by each terminal, and 3) how much traffic is generated by each application. Statistics 406*d* enables an operator 115 to promote used terminals and build billing schemes.

e. Link Optimizations

Implementing direct TCP/IP and Internet application protocols over WAN 105, and in particular a wireless network, produces poor performance because of low bandwidth, transmission delays and high data error rates. In order to solve the poor performance but still enable terminals to use standard TCP/IP, a Link Optimization software component plug-in 406*e* is provided. Link Optimization 406*e* traps all TCP/IP and specific Internet application protocols, such as Simple Mail Transfer Protocol ("SMTP") and Hypertext Transfer Protocol ("HTTP"), and converts the protocol to an optimized protocol. Link Optimization 406*e* then sends the converted packets to a backend server, such as manager server 102, which then deconverts the packets and sends them onto the Internet. In an embodiment of the present invention, terminals and users are not aware of using Link Optimization 406*e*.

f. Reverse Firewall

As opposed to a typical LAN firewall that protects a short distance wireless network 116 from intruders and hackers from the Internet or another network, a Reverse Firewall ("RFW") software component plug-in 406*g* protects an operator 115 or another network from terminals and applications on a short distance wireless network 116 generating traffic toward those networks. RFW 406*g* enables an operator 115 or another entity to define and enforce usage policies for applications/terminals on a short distance wireless network 116. RFW 406*g* prevents unnecessary costly transmission costs. Enforcement of usage policies at the short distance wireless network level (i.e. at device 106) prevents expensive packets from going through a cellular network that will be eventually dropped. Further, packets that may be later dropped do not use the limited cellular transmission bandwidth.

In an embodiment of the present invention, RFW 406*g* is attached to a cellular handset that has Bluetooth™ capability for implementing a short distance wireless network 116 and GSM/GPRS for cellular access to a WAN 105 (i.e. Internet or any other network). RFW 406*g* is programmed to drop packets based on the originating terminal, originating application/terminal pair or original application. For example, if a user has a PDA and a Notebook, an operator 115 can configure for File Transfer Protocol ("FTP") packets from the PDA to be dropped if FTP from a PDA is not allowed, or for example to drop video streaming packets originated from the Notebook if video streaming is something the operator 115 does not allow.

Another example includes blocking Notebook usage of such software as Napster in order to avoid cellular unintended usage by users and associated cost.

g. Terminal Programming over Bluetooth™ ("TPB")

TPB software component plug-in 406*f* enables the programming of terminals 107 over Bluetooth™ and over a cellular network. In an embodiment of the present invention, programming a terminal is accomplished by "flashing" or programming EEPROM memory in a terminal. An operator 115 or manufacturer can transfer a flash image to be flashed to device 106 having microrouter 404, and terminals 107 to be flashed. TPB 406*f* communicates with a Flashing software component in a terminal to 1) initiate the flashing process, 2) authenticate the flash image and 3) secure the flashing process.

In an embodiment of the present invention, flashing is done by transferring a full flash image. Alternatively, if there is not enough memory for the full flash image in device 106, the flash image is transferred block by block to eventually be flashed.

TPB 406*f* enables customizing a terminal, fixing software running on a terminal, and adding applications and/or improvements.

h. Short Message System ("SMS") Plug-In

SMS software component plug-in 406*h* allows terminals 107 to send messages between each other in a short distance wireless network 116. In an embodiment of the present invention, a terminal is a Messaging Terminal that enables Instant Messaging over IP. In an alternate embodiment of the present invention, SMS 406*h* enables standard legacy SMS or Instant Messaging over SMS.

In an embodiment of the present invention, SMS 406*h* is an SMS server for terminals 107 and an SMS termination for device 106. In this way, a protocol will be defined that enables each terminal to send a packet to SMS 406*h* with a destination device phone number+message text. SMS 406*h* then sends the SMS message to a cellular network.

SMS 406*h* also serves as an SMS receiver in an embodiment of the present invention. A terminal can inquire SMS 406*h* for received SMS messages and fetch those messages. In still another embodiment of the present invention, a terminal will also receive an IP broadcast message each time an SMS message is received by device 106.

i. Service Level Verification ("SLV")/Enforcement ("SLE")

SLV/SLE software component plug-in 406*i* enables an operator 115 to verify and enforce service level agreements with users. If an operator 115 wants to enforce service levels, such as specifically limiting the amount of traffic over a cellular network, SLV/SLE 406*i* is added in order to avoid usage of expensive airtime.

In an embodiment of the present invention, SLV/SLE 406*i* allows a user to generate an unlimited amount of cellular traffic from device 106 during the night but a limited amount during the day. So during the day, if the limited amount is exceeded no more traffic can be generated from device 106 and packets are dropped by SLV/SLE 406*i*. Similar policies may likewise be enforced. SLV/SLE 406*i* also identifies and notifies operator 115 of missed cellular network usage by a particular user due to enforcement in an embodiment of the present invention.

j. Device Resources Access ("DRA")

DRA software component plug-in 406*j* enables terminals to gain access (according to defined restrictions) to device 106 resources. This enables a terminal to implement a Device Resources Access protocol over IP in order to gain access to any of the following resources: 1) phone book, 2) play a ring tone, 3) initiate a call, 4) user interface, or 5) other device resources.

DRA 406*j* enables a terminal to read/modify/add phone book entries in a phone book stored on device 106. In a preferred embodiment, a vCard format is used to exchange entry information between device 106 and terminals 107. This enables a better consistent experience for users. For example, DRA 406*j* provides a user immediate access to a device 106 phone book entries for sending a message from a messaging terminal without having to type the contact information from the phone book.

DRA 406*j* enables a user to be alerted by using a device 106 ring buzzer. Thus, a terminal in short distance wireless network 116 can use a device 106 ring buzzer for alerting a user.

DRA 406*j* enables a terminal, such as a PDA or an Outlook application on a notebook computer, to initiate a telephone call at device 106. In an embodiment of the present invention, clicking a phone icon near a phone number on a notebook display initiates a cellular telephone call.

Likewise, DRA 406*j* enables a terminal to interact with a user through device 106 menus and input components.

k. Terminal Management/Monitoring ("MNG")

MNG software component plug-in 406*k* enables management, configuration and monitoring of terminals 107 in an embodiment of the present invention. Instead of each terminal implementing a proprietary management protocol and console, each terminal exposes a "registry" of parameters and MNG 406*k* implements a protocol enabling a managing server 102 to browse this registry, get values and set values.

IV. Usage Scenarios

A. PDA Synchronizes Against the Corporate Exchange Server

In this scenario, a user is a traveling professional who has a PDA and needs to synchronize it against a corporate exchange server while on the road. This synchronization needs to be done securely as the only way to enter the corporate network is via a certified and Information Technology ("IT") manager approved VPN.

The user also has a cellular telephone having a microrouter 404 and VPN client 406*j*, which the IT manager installed. The IT manager used the remote management capabilities of the cellular telephone in order to configure a VPN to connect to the corporate network, as well as configured the firewall to block Internet access while the VPN is in use. The user is totally unaware of the VPN and its configurations.

As the user turns on the PDA, which is a Bluetooth™ equipped PDA with a LAN Access profile implementation, the PDA connects to the cellular telephone via the BAP 551 utilizing Bluetooth™. The PDA receives a private IP address.

The user loads the PDA synchronization software, which is configured to synchronize against the corporate exchange server. When hitting the "Synchronize" button, the PDA opens a TCP connection to the IP address of the corporate network.

The IP packets travel across the Bluetooth™ air interface to the cellular telephone using a PPP protocol and PPP 552. When reaching the cellular telephone, the packets go through NAT 553 and the private IP address is translated to a public IP address. The public IP address goes to VPN 406*f*, which identifies the destination as the corporate LAN. VPN 406*f* packages the packet over an Internet tunnel, encrypts and signs it. The packet is then sent through the cellular air interface and the Internet, reaching the corporate VPN and exchange servers. The PDA is totally unaware of this process.

B. PDA Synchronizes Against a Notebook on the Short Distance Wireless Network

In this scenario, the user, as described above, needs to synchronize the PDA with a notebook computer.

The notebook has a Bluetooth™ card with a LAN access profile. Once the notebook is turned on, it connects to the user's cellular telephone having microrouter 404 and receives a private IP address.

The user runs the same synchronization software on his PDA, only this time chooses to synchronize with the notebook.

When hitting the "Synchronize" button on the PDA, the PDA opens a TCP connection to the notebook's IP address.

An IP packet travels, from the PDA, through the Bluetooth™ interface over a PPP protocol and reaches routing 550 in microrouter 404 that identifies the packet destined to a private IP address of the notebook. The IP packet is then sent to the notebook through the notebook's Bluetooth™ interface over a PPP protocol.

C. Web Pad Browsing the Internet

In this scenario, a user has a Web Pad equipped with a Bluetooth™ interface with a LAN access profile. The Web Pad is connected to the cellular telephone having microrouter 404, which is in the user's bag, and receives a private IP address through the LAN access profile. The Web Pad also has a web browser.

The user pulls out his Web Pad, goes to a URL line of the browser and types http://www.iximobile.com. The web browser first has to translate the name www.iximobile.com into a public IP address. This is done using a Domain Naming Service ("DNS.") protocol. The Web Pad already received the private IP address of a DNS plug-in when it connected to the cellular telephone. The Web Pad sends a resolve request to the DNS plug-in software component in microrouter 404. DNS software component looks at its cache for the name. If the name is not available, the DNS plug-in software component goes to the next DNS on a WAN 105 to get the public IP address of the name. In both cases, the DNS eventually gets the public IP address for www.iximobile.com and sends the reply back to the Web Pad. In an embodiment of the present invention, a DNS software component is a plug-in 406 or a hook 590.

When the Web Pad receives the public IP address of the web site, it opens a TCP connection at port 80 of that public IP address in order to implement the HTTP protocol and get the HTML page to display.

V. Manager Server

Figure 8:
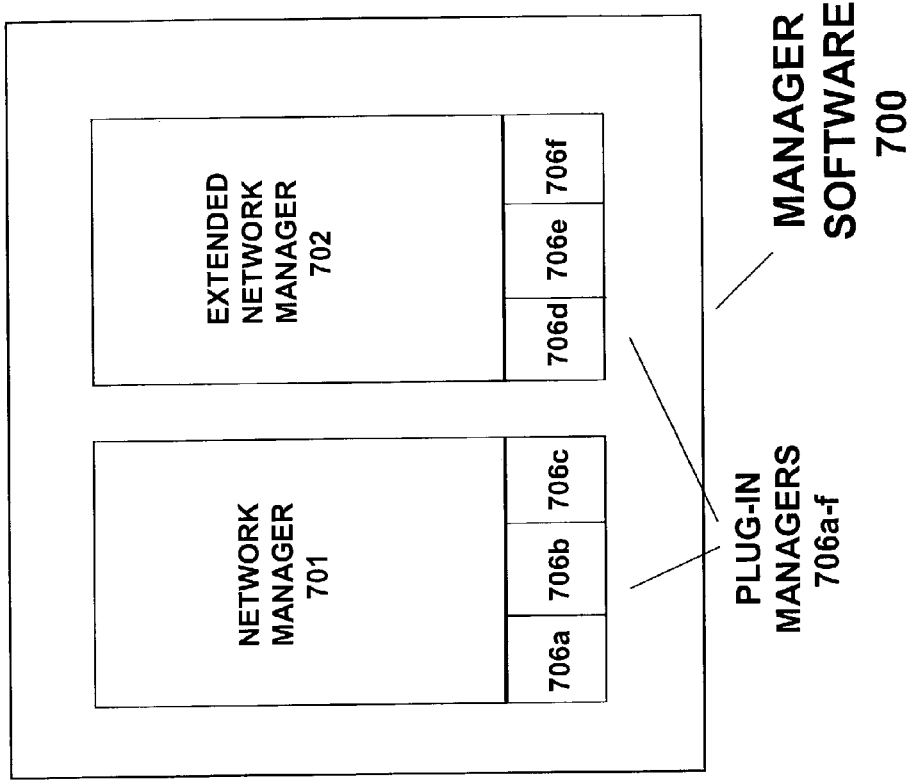
FIG. 8 is a software block diagram of manager software in manager server 102 illustrated in FIG. 1 according to an embodiment of the present invention.

In an embodiment of the present invention, Manager server 107, illustrated in FIG. 1, includes Manager software component 700 illustrated in FIG. 8. In an embodiment of the present invention, Manager software component 700 is used to load microrouter 404 and plug-ins 406 into device 106. In an additional embodiment of the present invention, Manager software 700 is used to manage, configure and collect data from short distance wireless network 116. In still another embodiment of the present invention, manager software 700 is not used with short distance wireless network 116.

Manager server 102 includes a Proliant server available from Compaq® Computer Corporation of Houston, Tex. having a Windows® 2000 operating system available from Microsoft® Corporation in an embodiment of the present invention.

In an embodiment of the present invention, Manager software component 700 has an IP interface in order to gain access to microrouter 404 and access a device notification service, such as SMS 406h. Manager 700 can be installed on any network that has IP connectivity to microrouter 404. Manager 700 can be installed by a service provider on Internet 103, or by an operator 115 on its IP backend network having server 102.

Manager software component 700 includes two software components, Network Manager software 701 and Extended Network Manager software 702, in an embodiment of the present invention.

Network Manager software 701 is responsible for, but not limited to, the following functions: 1) configuring an IP parameter, such as IP domain range or policies, 2) configuring plug-ins 406 currently installed and executed, 3) enabling/disabling an installed plug-ins 406, 4) loading new plug-ins in microrouter 404, and 5) removing plug-ins 406 from microrouter 404.

Network Extended Manager software 702 is responsible for, but not limited to, the following functions: 1) collecting usage profiles for each microrouter 404 and each terminal in short distance wireless network 116, 2) managing PINs, such as denying access to short distance wireless network 116 for a particular terminal or approving access to short distance wireless network 116 for other terminals, 3) managing security, such as configuring VPN 406b or configuring Firewall 406c, 4) configuring Link Optimization 406e, and 5) configuring Quality of Service ("QoS") parameters in microrouter 404.

In an embodiment of the present invention, Plug-In Manager software components 706a–f are stored in manager server 102 and use network manager software component 701 and/or Extended Network Manager software component 702 for accessing and controlling network plug-ins 406a–k. For example, a Plug-In Manager software component 706d is used to obtain statistics information from Statistics plug-in 406d in microrouter 404. In an embodiment of the present invention, there is a corresponding plug-in Manager software component in manager software 700 for every plug-in software component in microrouter 404.

VI. Conclusion

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A device to provide communication between a wide area network and a short distance wireless network, comprising:
   a memory to store a first wide area network address, a second wide area network address and a router software component;
   a processor coupled to the memory; and,
   wherein the processor and the router software component transfers a first plurality of packets between the device and the wide area network using the first wide area network address, and wherein the processor and the router software component discontinues the transfer of the first plurality of packets responsive to receiving the second wide area network address and transferring a second plurality of packets between the device and the wide area network using the second wide area network address,
   wherein the first and second wide area network addresses are provided by the wide area network,
   wherein the second wide area network address is received after a temporary disconnection between the wide area network and the device.

2. The device of claim 1, wherein the wide area network includes a cellular network.

3. The device of claim 1, wherein the device transfers the plurality of packets between the device and the wide area network using a Point-to-Point Protocol ("PPP") connection.

4. The device of claim 3, wherein the transfer discontinues by terminating the PPP connection.

5. The device of claim 1, wherein the device transfers the plurality of packets between the device and the wide area network using a Transmission Control Protocol ("TCP") connection.

6. The device of claim 5, wherein the transfer discontinues by terminating the TCP connection.

7. The device of claim 1, wherein the router software component includes a network address translator ("NAT") component to translate between the first wide area network address and the short distance wireless network address.

8. The device of claim 7, wherein the transfer of the first plurality of packets includes providing a TCP connection and the discontinue transfer of the plurality of packets includes disconnecting the TCP connection.

9. The device of claim 1, wherein the router software component includes a network address port translation ("NAPT") component to translate between the first wide area network address and the short distance wireless network address.

10. The device of claim 1, wherein the wide area network includes a plurality of public IP addresses including the first and second wide area network addresses and the short distance wireless network includes a plurality of private IP addresses, and wherein the router software component translates a first IP address in the plurality of public IP addresses to a second IP address in the plurality of private IP addresses.

11. The device of claim 1, wherein the device further includes a Bluetooth™ processor and a 2.4 GHZ transceiver.

12. The device of claim 1, wherein the short distance wireless network is a Bluetooth™ wireless local area network.

13. The device of claim 1, wherein the short distance wireless network is an 802.11 wireless local area network.

14. A method for transferring information between a wide area network and a short distance wireless network, comprising the steps of:

obtaining a first wide area network address from the wide area network for a first device in the short distance wireless network;

storing the first wide area network address in the first device;

transferring a first plurality of packets, using the first wide area network address, between the first device and the wide area network;

obtaining a second wide area network address from the wide area network for the first device, wherein the second wide area network address is obtained after a temporary disconnection between the first device and the wide area network;

storing the second wide area network address in the first device;

discontinuing the transferring of the first plurality of packets in response to the step of obtaining the second wide area network address; and, transferring a second plurality of packets, using the second wide area network address, between the first device and the wide area network.

15. The method of claim 14, wherein the step of transferring the first plurality of packets includes a step of providing a PPP connection.

16. The method of claim 14, wherein the step of transferring the first plurality of packets includes the step of providing a TCP connection.

17. The method of claim 14, wherein the first and second wide area network addresses are IP source addresses.

18. The method of claim 14, wherein the wide area network includes a cellular network providing dynamic wide area network addresses including the first and second wide area network addresses.

19. The method of claim 14, wherein the storing steps include storing the first and second network addresses in a NAT software component.

20. A system for providing communication between a wide area network and a short distance wireless network, comprising:

a hand-held wireless device, including:
  a cellular transceiver to communicate with the wide area network, including to receive a first and second IP address for the hand-held wireless device;
  a memory, coupled to the transceiver, to store the first and second IP address;
  a routing software component, stored in the memory, to transfer a first plurality of packets, using the first IP address, between the wide area network and the short distance wireless network and to discontinue the transfer of the first plurality of packets and transfer a second plurality of packets using the second IP address in response to receiving the second IP address, after a temporary disconnect between the wide area network and the short distance wireless network; and,
a first wireless device to transfer the first and second plurality of packets to the hand-held wireless device, wherein the first wireless device has a first private network address.

21. The system of claim 20, wherein the routing software component transfers the first and second plurality of packets using a PPP protocol and discontinues the transfer by terminating a PPP connection.

22. The system of claim 20, wherein the routing software component transfers the first and second plurality of packets using a TCP protocol and discontinues the transfer by terminating the TCP connection.

23. The system of claim 20, wherein the first wireless device is selected from a group consisting of a desktop computer, a laptop computer, a personal digital assistant, a headset, a pager, a pen, a printer, a watch, a digital camera and an equivalent.

24. The system of claim 20, wherein the hand-held wireless device uses a Global System for Mobile communications ("GSM") protocol to communicate with the wide area network.

25. The system of claim 20, wherein the hand-held wireless device uses a Code Division Multiple Access ("CDMA") protocol to communicate with the wide area network.

26. The system of claim 20, wherein the hand-held wireless device uses a CDMA2000 protocol to communicate with the wide area network.

27. The system of claim 20, wherein the hand-held wireless device uses a Universal Mobile Telecommunications System ("UMTS") protocol to communicate with the wide area network.

28. The system of claim 20, wherein the hand-held wireless device uses a Time Division Multiple Access ("TDMA") protocol to communicate with the wide area network.

29. The system of claim 20, further comprising:
  a second wireless device to transfer a third plurality of packets to the hand-held wireless device, wherein the second wireless device has a second private network address.

30. An article of manufacture, including a computer readable medium, comprising:
  a short-range radio software component to provide a short-range radio signal in a short distance wireless network;
  a cellular software component to provide a communication signal in a wide area network; and,
  a routing software component to transfer a first plurality of packets, using a first wide area network address, between the wide area network and the short distance wireless network and to discontinue the transfer of the first plurality of packets and transfer a second plurality of packets using a second wide area network address in response to receiving the second wide area network address after a temporary disconnection between the wide area network and the short distance wireless network.

31. The article of manufacture of claim 30, wherein the first and second wide area network addresses are IP source addresses.

32. The article of manufacture of claim 30, wherein the routing software component establishes a PPP connection to transfer the first and second plurality of packets.

33. The article of manufacture of claim 30, wherein the routing software component establishes a TCP connection to transfer the first and second plurality of packets.

* * * * *